United States Patent [19]
Pai et al.

[11] Patent Number: 5,860,158
[45] Date of Patent: Jan. 12, 1999

[54] CACHE CONTROL UNIT WITH A CACHE REQUEST TRANSACTION-ORIENTED PROTOCOL

[75] Inventors: Yet-Ping Pai, Milpitas; Le T. Nguyen, Monte Sereno, both of Calif.

[73] Assignee: Samsung Electronics Company, Ltd., Seoul, Rep. of Korea

[21] Appl. No.: 751,149

[22] Filed: Nov. 15, 1996

[51] Int. Cl.[6] ........................................... G06F 13/00
[52] U.S. Cl. .................................. 711/118; 711/130
[58] Field of Search .................................... 711/119, 120, 711/130, 140, 118

[56] References Cited

U.S. PATENT DOCUMENTS

| | | | |
|---|---|---|---|
| 4,695,943 | 9/1987 | Keeley et al. | 711/140 |
| 4,701,844 | 10/1987 | Thompson et al. | 711/119 |
| 4,707,784 | 11/1987 | Ryan et al. | 711/140 |
| 4,899,275 | 2/1990 | Sachs et al. | 711/3 |
| 5,377,345 | 12/1994 | Chang et al. | 395/425 |
| 5,418,973 | 5/1995 | Ellis et al. | 395/800 |
| 5,524,265 | 6/1996 | Balmer et al. | 711/212 |
| 5,574,849 | 11/1996 | Sonnier et al. | 395/182.1 |
| 5,659,782 | 8/1997 | Senter et al. | 395/800.23 |

*Primary Examiner*—Tod R. Swann
*Assistant Examiner*—Felix B. Lee
*Attorney, Agent, or Firm*—Skjerven, Morrill, MacPherson, Franklin & Friel, L.L.P.; Stephen A. Terrile

[57] ABSTRACT

A cache control unit and a method of controlling a cache. The cache is coupled to a cache accessing device. A first cache request is received from the device. A request identification information is assigned to the first cache request and provided to the requesting device. The first cache request may begin to be processed. A second cache request is received from the cache accessing device. The second cache request is assigned to the first cache request and provided to the requesting device. The first and second cache requests are finally fully serviced.

37 Claims, 8 Drawing Sheets

CACHE CONTROL UNIT WITH A CACHE REQUEST TRANSACTION-ORIENTED PROTOCOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to providing processors with fast memory access and, more particularly, to providing control of cache memory systems.

2. Description of the Related Art

Processors often employ memories which are relatively slow when compared to the clock speeds of the processors. To speed up memory access for such processors, a relatively small amount of fast memory can be used in a data cache.

A cache can mediate memory accesses and lessen the average memory access time for all or a large portion of the address space of a processor even though the cache is small relative to the address space. Caches do not occupy a specific portion of the address space of the processor but instead include tag information which identifies addresses for information in lines of the cache.

Typically, a cache compares an address received from a processor to tag information stored in the cache to determine whether the cache contains a valid entry for the memory address being accessed. If such a cache entry exists (i.e. if there is a cache hit), the processor accesses (reads from or writes to) the faster cache memory instead of the slower memory. In addition to tag information, a cache entry typically contains a "validity" bit and a "dirty" bit which respectively indicated whether the associated information in the entry is valid and whether the associated information contains changes to be written back to the slower memory. If there is no cache entry for the address being accessed (i.e. there is a cache miss), access to the slower memory is required for the cache to create a new entry for the just accessed memory address.

Caches use cache policies such as "least recently used" or "not last used" replacement techniques to determine which existing entries are replaced with new entries. Typically, computer programs access the same memory addresses repeatedly. Therefore, the most recently accessed data is likely to be accessed again soon after the initial access. Because recently accessed data is available in the cache for subsequent accesses, caches can improve access time across the address space of the processor.

A different method for increasing processor speed is the use of parallel processing techniques. For example, by providing a number of functional units which perform different tasks, a "very long instruction word" (VLIW) processor can perform multiple functions through a single instruction. Also, a general purpose processor and a vector processor may be integrated to operate in parallel. An integrated multiprocessor is able to achieve high performance with low cost since the two processors perform only tasks ideally suited for each processor. For example, the general purpose processor runs a real time operating system and performs overall system management while the vector processor is used to perform parallel calculations using data structures called "vectors". (A vector is a collection of data elements typically of the same type.) Multiprocessor configurations are especially advantageous for operations involving digital signal processing such as coding and decoding video, audio, and communications data.

SUMMARY OF THE INVENTION

It has been discovered that accesses to a cache by multiple devices may be managed by a cache control unit that includes transaction identification logic to identify cache accesses. Such an apparatus provides the advantage of improving performance by increasing the speed of memory accesses by one or more devices. Specifically, such an apparatus allows the cache to service later arriving requests before earlier arriving requests.

In one embodiment of the present invention, a cache is coupled to a cache accessing device. A first cache request is received from the device. A request identification information is assigned to the first cache request and provided to the requesting device. The first-cache request may begin to be processed. A second cache request is received from the cache accessing device. The second cache request is assigned to the first cache request and provided to the requesting device. The first and second cache requests are finally fully serviced.

In another embodiment, a cache system includes a cache for temporarily storing information and a cache control unit. The cache control unit includes access control logic, identification logic, and result logic. The access control logic receives and executes cache accesses by a cache accessing device. The identification logic assigns request identification information to each of the cache accesses, and provides the request identification information to the cache accessing device. The identification logic is capable of providing the request identification information prior to the execution of the cache accesses by the access control logic. The result logic provides the request identification information and the data requested by the cache accessing device to the cache accessing device if the cache access was a read.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the preferred embodiments. The description is intended to be illustrative of the invention and should not be taken to be limiting. Many variations, modifications, additions and improvements may fall within the scope of the invention as defined in the claims that follow.

Figure 1:
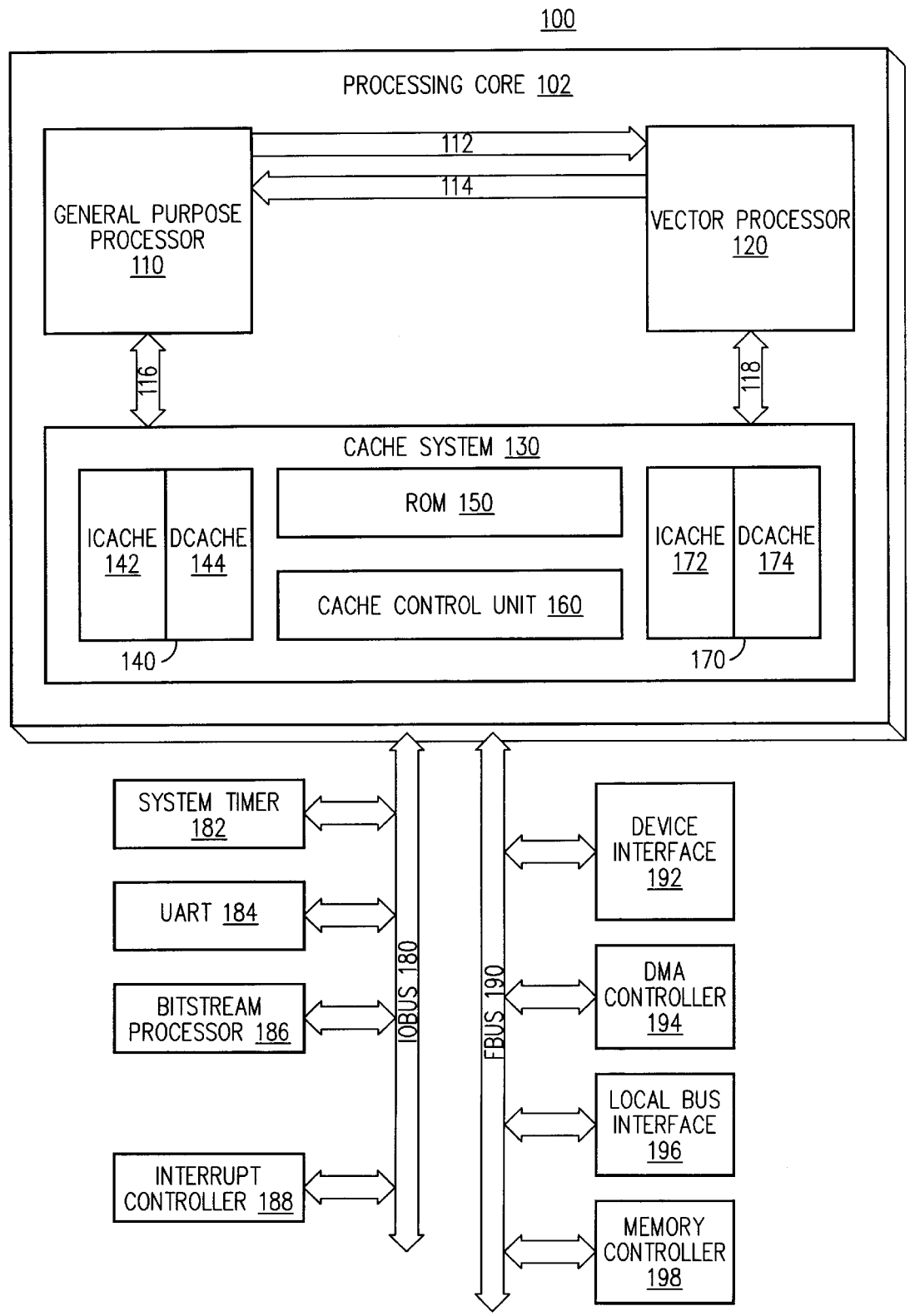
FIG. 1 shows a block diagram of a multimedia signal processor in accordance with an embodiment of the invention.

Referring to FIG. 1, processor 100 includes a general purpose processor 110 coupled to a vector processor 120. General purpose processor 110 and vector processor 120 are coupled via control bus 112 and interrupt line 114. General purpose processor 110 and vector processor 120 are coupled to cache system 130 via bus 116 and bus 118, respectively. Cache system is coupled to input/output bus (IOBUS) 180 and fast bus (FBUS) 190. IOBUS 180 is coupled to system timer 182, universal asynchronous receiver-transmitter (UART) 184, bitstream processor 186 and interrupt controller 188. FBUS 190 is coupled to device interface 192, direct memory access (DMA) controller 194, local bus interface 196 and memory controller 198.

General purpose processor 110 and vector processor 120 execute separate program threads in parallel. General purpose processor 110 typically executes instructions which manipulate scalar data. Vector processor 120 typically executes instructions having vector operands, i.e., operands each containing multiple data elements of the same type. In some embodiments, general purpose processor 110 has a limited vector processing capability. However, applications that require multiple computations on large arrays of data are not suited for scalar processing or even limited vector processing. For example, multimedia applications such as audio and video data compression and decompression require many repetitive calculations on pixel arrays and strings of audio data. To perform real-time multimedia operations, a general purpose processor which manipulates scalar data (e.g. one pixel value or sound amplitude per operand) or only small vectors must operate at a high clock frequency. In contrast, a vector processor executes instructions where each operand is a vector containing multiple data elements (e.g. multiple pixel values or sound amplitudes). Therefore, vector processor 120 can perform real-time multimedia operations at a fraction of the clock frequency required for general purpose processor 110 to perform the same function. Thus, by allowing an efficient division of the tasks required for, e.g., multimedia applications, the combination of general purpose processor 110 and vector processor 120 provides high performance per cost. Although in the preferred embodiment, processor 100 is for multimedia applications, processor 100 may be any type of processor.

In one embodiment, general purpose processor 110 executes a real-time operating system designed for a media circuit board communicating with a host computer system. The real-time operating system communicates with a primary processor of the host computer system, services input/output (I/O) devices on or coupled to the media circuit board, and selects tasks which vector processor 120 executes. In that embodiment, vector processor 120 is designed to perform computationally intensive tasks requiring the manipulation of large data blocks, while general purpose processor 110 acts as the master processor to vector processor 120.

In the exemplary embodiment, general purpose processor 110 is a 32-bit RISC processor which operates at 40 Mhz and conforms to the standard ARM7 instruction set. The architecture for an ARM7 reduced instruction set computer (RISC) processor and the ARM7 instruction set is described in the ARM7DM Data Sheet available from Advanced RISC Machines Ltd. General purpose processor 110 also implements an extension of the ARM7 instructions set which includes instructions for an interface with vector processor 120. The extension to the ARM7 instruction set for the exemplary embodiment of the invention is described in copending, U.S. patent application Ser. No. 08/699,295, attorney docket No. M-4366 U.S., filed on Aug. 19, 1996, entitled "System and Method for Handling Software Interrupts with Argument Passing," naming Seungyoon Peter Song, Moataz A. Mohamed, Heon-Chul Park and Le Nguyen as inventors, which is incorporated herein by reference in its entirety. General purpose processor 110 is coupled to vector processor 120 by control bus 112 to carry out the extension of the ARM7 instruction set. Furthermore, interrupt line 114 is used by vector processor 120 to request an interrupt on general purpose processor 110.

In the exemplary embodiment, vector processor 120 has a single-instruction-multiple-data (SIMD) architecture and manipulates both scalar and vector quantities. In the exemplary embodiment, vector processor 120 consists of a pipelined reduced instruction set computer (RISC) central processing unit (CPU) that operates at 80 Mhz and has a 288-bit vector register file. Each vector register in the vector register file can contain up to 32 data elements. A vector register can hold thirty-two 8-bit or 9-bit integer data elements, sixteen 16-bit integer data elements, or eight 32-bit integer or floating point elements. Additionally, the exemplary embodiment can also operate on a 576-bit vector operand spanning two vector registers.

The instruction set for vector processor 120 includes instructions for manipulating vectors and for manipulating scalars. The instruction set for the exemplary embodiment of the invention and an architecture for implementing the instruction set is described in the pending U.S. patent application Ser. No. 08/699,597, attorney docket No. M-4355 U.S., filed on Aug. 19, 1996, entitled "Single-Instruction-Multiple-Data Processing in a Multimedia Signal Processor," naming Le Trong Nguyen as inventor, which is incorporated herein by reference in its entirety.

General purpose processor 110 performs general tasks and executes a real-time operating system which controls communications with device drivers. Vector processor 120 performs vector tasks. General purpose processor 110 and vector processor 120 may be scalar or superscalar processors. The multiprocessor operation of the exemplary embodiment of the invention is more fully described in pending U.S. patent application Ser. No. 08/697,102, attorney docket No. M-4354 U.S., filed on Aug. 19, 1996, entitled "Multiprocessor Operation in a Multimedia Signal Processor," naming Le Trong Nguyen as inventor, which is incorporated herein by reference in its entirety.

Referring again to FIG. 1, cache system 130 contains a fast random access memory (RAM) block (shown graphically as blocks 140 and 170), read only memory (ROM) 150 and a cache control unit 160. Cache system 130 can configure the RAM block into (i) an instruction cache 142 and a data cache 144 for general purpose processor 110, and (ii) an instruction cache 172 and data cache 174 for vector processor 120. In the preferred embodiment, RAM block 140, 170 includes static RAM (SRAM).

In an embodiment of a computer system according to the invention, general purpose processor 110 and vector processor 120 share a variety of on-chip and off-chip resources which are accessible through a single address space. Cache system 130 couples a memory to any of several memory mapped devices such as bitstream processor 186, UART 184, DMA controller 194, local bus interface 196, and a coder-decoder (CODEC) device interfaced through device interface 192. Cache system 130 can use a transaction-oriented protocol to implement a switchboard for data access among the processors and memory mapped resources. For example, the transaction-oriented protocol provides that if completion of an initial cache transaction is delayed (e.g., due to a cache miss), other cache access transactions may proceed prior to completion of the initial transaction. Thus, "step-aside-and-wait" capability is provided in this embodiment of a cache management system according to the invention. A similar transaction-oriented protocol is further described in pending, U.S. patent application Ser. No. 08/731,393, attorney docket No. M-4398 U.S., filed on Oct. 18, 1996, entitled "Shared Bus System with Transaction and Destination ID," naming Amjad Z. Qureshi and Le Trong Nguyen as inventors, which is incorporated herein by reference in its entirety.

Cache system 130 couples general purpose processor 110 and vector processor 120 to two system busses: IOBUS 180 and FBUS 190. IOBUS 180 typically operates at a slower frequency than FBUS 190. Slower speed devices are coupled to IOBUS 180, while higher speed devices are coupled to FBUS 190. By separating the slower speed devices from the higher speed devices, the slower speed devices are prevented from unduly impacting the performance of the higher speed devices.

Cache system 130 also serves as a switchboard for communication between IOBUS 180, FBUS 190, general purpose processor 110, and vector processor 120. In most embodiments of cache system 130, multiple simultaneous accesses between the busses and processors are possible. For example, vector processor 120 is able to communicate with FBUS 190 at the same time that general purpose processor 110 is communicating with IOBUS 180. In one embodiment of the invention, the combination of the switchboard and caching function is accomplished by using direct mapping techniques for FBUS 190 and IOBUS 180. Specifically, the devices on FBUS 190 and IOBUS 180 can be accessed by general purpose processor 110 and vector processor 120 by standard memory reads and write at appropriate addresses.

FBUS 190 provides an interface to the main memory. The interface unit to the memory is composed of a four-entry address queue and a one-entry write-back latch. The interface can support one pending refill (read) request from general purpose processor instruction cache 142, one pending refill (read) request from vector processor instruction cache 172, one write request from vector processor data cache 174, and one write-back request from vector processor data cache due to a dirty cache line.

FBUS 190 is coupled to various high speed devices such as a memory controller 198 and a DMA controller 194, a local bus interface 196, and a device interface 192. Memory controller 198 and DMA controller 194 provide memory interfaces. Local bus interface 196 provides an interface to a local bus coupled to a processor. Device interface 192 provides interfaces to various digital-to-analog and analog-to-digital converters (DACs and ACDs, respectively) that may be coupled to processor 100 for video, audio or communications applications.

Memory controller 198 provides an interface for a local memory if a local memory is provided for processor 100. Memory controller 198 controls reads and writes to the local memory. In the exemplary embodiment, memory controller 198 is coupled to and controls one bank of synchronous dynamic RAMs (two 1M×16 SDRAM chips) configured to use 24 to 26 address bits and 32 data bits and having the features of: (i) a "CAS-before-RAS" refresh protocol, performed at a programmable refresh rate, (ii) partial writes that initiate Read-Modify-Write operations, and (iii) internal bank interleave. Memory controller 198 also provides a 1:1 frequency match between the local memory and FBUS 190, manual "both bank precharge", and address and data queuing to better utilize FBUS 190. Synchronous DRAM are known to effectively operate at such frequencies (80 MHz), and standard fast page DRAMs and extended data out (EDO) DRAMs could also be used. DRAM controllers with capabilities similar to memory controller 198 in the exemplary embodiment are known in the art.

DMA controller 194 controls direct memory accesses between the main memory of a host computer and the local memory of processor 100. Such DMA controllers are well known in the art. In some embodiments of the invention, a memory data mover is included. The memory data mover performs DMA from one block of memory to another block of memory.

Local bus interface 196 implements the required protocol for communications with a host computer via a local bus. In the exemplary embodiment, local bus interface 196 provides an interface to a 33-MHz, 32-bit PCI bus. Such interfaces are well known in the art.

Device interface 192 provides a hardware interface for devices such as audio, video and communications DACs and ADCs which would typically be on a printed circuit board with a processor 100 adapted for multimedia applications. Device interface 192 may be customized for the particular application of processor 100. In particular, device interface 192 might only provide an interface for specific devices or integrated circuits (ICs). Typical units within device interface 192 provide an interface for connection of standard ADCs, DACs, or CODECs. Designs for ADC, DAC, and CODEC interfaces are well known in the art and not described further here. Other interfaces which might be employed include but are not limited to an integrated services digital network (ISDN) interface for digital telephone and interfaces for busses such as for a microchannel bus. In one embodiment of processor 100, device interface 192 is an application specific integrated circuit (ASIC) which can be programmed to perform a desired functionality.

In the preferred embodiment, IOBUS 180 operates at a frequency (40 MHz) that is lower than the operating frequency (80 MHz) of FBUS 190. Also in the preferred embodiment, IOBUS 180 is coupled to system timer 182, UART 184, bitstream processor 186, and interrupt controller 188.

System timer 182 interrupts general purpose processor 110 at scheduled intervals which are selected by writing to registers corresponding to system timer 182. In the exemplary embodiment, system timer 182 is a standard Intel 8254 compatible interval timer having three independent 16-bit counters and six programmable counter modes.

UART 184 is a serial interface which is compatible with the common 16450 UART integrated circuit. The 16450 UART IC is for use in modem or facsimile applications which require a standard serial communication ("COM") port of a personal computer.

Bitstream processor 186 is a fixed hardware processor which performs specific functions on an input or output bitstream. In the exemplary embodiment, bitstream processor 186 performs initial or final stages of MPEG coding or decoding. In particular, bitstream processor 186 performs variable length (Huffman) coding and decoding, and packing and unpacking of video data in "zig-zag" format. Bitstream processor 186 operates in parallel with and under the control of general purpose processor 110 and vector processor 120. Processors 110 and 120 configure bitstream processor 186 via control registers. An exemplary embodiment of bitstream processor 186 is described in pending U.S. patent application Ser. No. 08/699,303, attorney docket No. M-4368 U.S., filed on Aug. 19, 1996, entitled "Methods and Apparatus for Processing Video Data," naming Cliff Reader, Jae Cheol Son, Amjad Qureshi and Le Nguyen as inventors, which is incorporated herein by reference in its entirety.

Interrupt controller 188 controls interrupts of general purpose processor 110 and supports multiple interrupt priorities. A mask register is provided to allow each interrupt priority to be individually masked. In the exemplary embodiment, interrupt controller 188 is programmable and implements the standard Intel 8259 interrupt system that is common in x86-based personal computers. A highest priority (level 0) interrupt is assigned to system timer 242. Priority levels 1, 2, 3, and 7 are respectively assigned to a virtual frame buffer, DMA controller 194 and device interface 192, bitstream processor 186, local bus interface 196, and UART 184. Interrupt priority levels 4, 5, and 6 are unassigned in the exemplary embodiment of the invention. The virtual frame buffer at priority level 1, which is included in some embodiments of the invention, emulates a standard VGA frame buffer.

Figure 2:
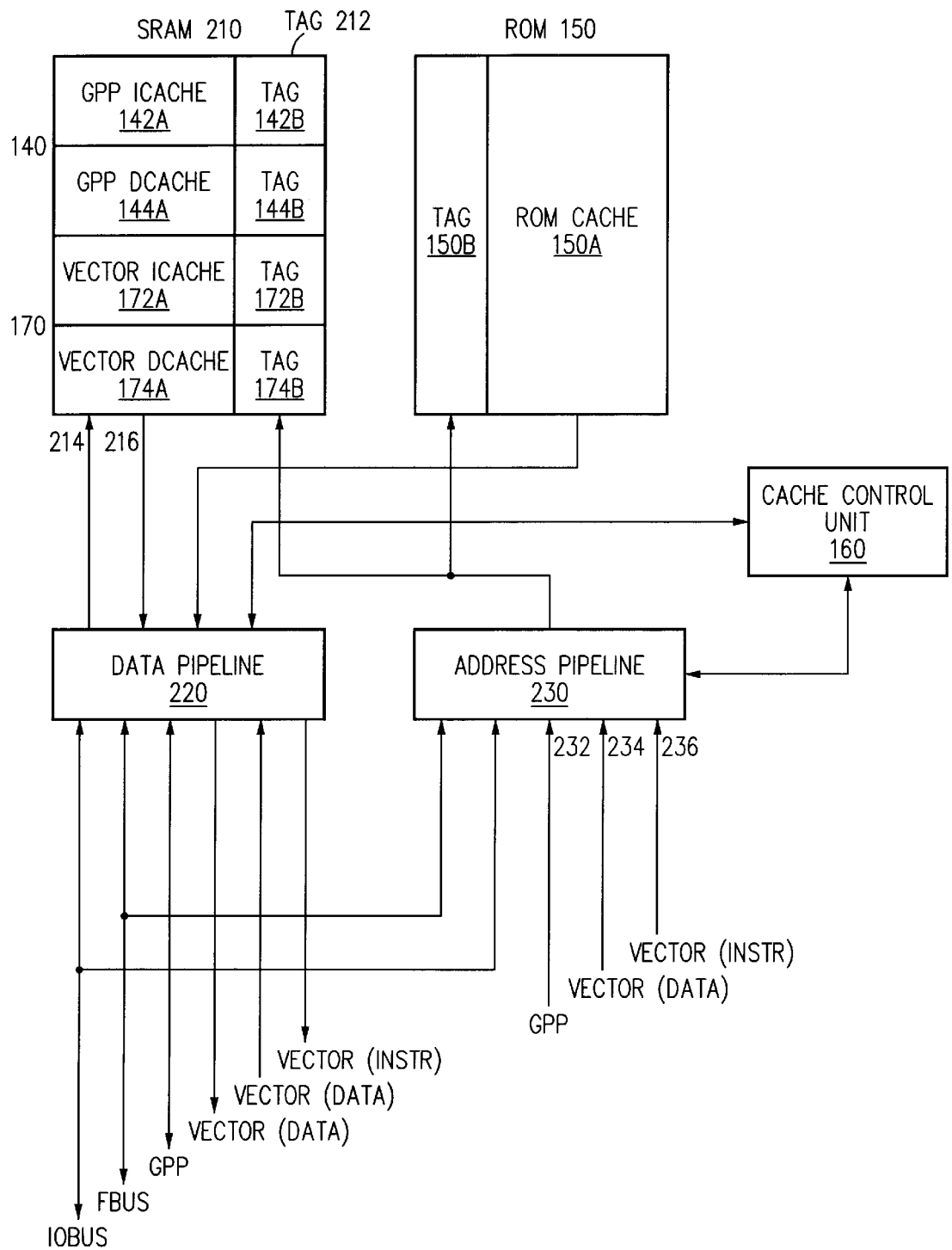
FIG. 2 shows a block diagram of a cache system in accordance with an embodiment of the invention.

Referring to FIG. 2, cache system 130 includes SRAM block 210, ROM 150, data pipeline 220, address pipeline 230 and cache control unit 160. SRAM block 210, ROM 150 and cache control unit 200 are each separately coupled to data pipeline 220 and to address pipeline 230. Data pipeline 220 is coupled to IOBUS 180, FBUS 190, general purpose processor 110 and vector processor 120. Address pipeline 230 is coupled to general purpose processor 110 and vector processor 120.

SRAM block 210 is divided into four memory banks to form instruction cache 142 and data cache 144 for use with general purpose processor 110, as well as instruction cache 172 and data cache 174 for use with vector processor 120. In any cycle, cache system 130 can accept one read request and one write request. SRAM block 210 is a dual-ported memory circuit, with read port 216 and write port 214, so that simultaneous reading and writing of SRAM block 210 is supported. SRAM block 210 also contains a tag section 212 which is subdivided into TAG 142B, TAG 144B, TAG 172B and TAG 174B for each of the respective memory banks 142A, 144A, 172A and 174A. The tag RAM has two read ports. The read port address and the write port address can be compared with the internal cache tags for hit or miss condition. The tag information for each cache line includes a tag, two validity bits, two dirty bits, and use information. Each validity bit and dirty bit corresponds to a 32-byte half of a cache line which is equal to the amount of data transferred by a single read or write operation. Each dirty bit indicates a single 256-bit write to external memory, and each validity bit indicates a single 256-bit read from external memory. The used bits are for the entry replacement scheme used to create new entries. Four sets of cache bank select signals and three sets of line indices are needed to access SRAM block 210.

ROM 150 includes ROM cache field 150A and ROM tag field 150B. ROM 150 can be configured as a cache. Although tag field 150B cannot be modified, individual addresses can be marked as invalid so that data or instructions can be brought from memory to be used in place of the data or instructions in ROM 150. ROM 150 contains frequently used instructions and data for general purpose processor 110 and vector processor 120. In the exemplary embodiment, ROM 150 contains: reset and initialization procedures; self-test diagnostics procedures; interrupt and exception handlers; and subroutines for soundblaster emulation; subroutines for V.34 modem signal processing; general telephony functions; 2-dimensional and 3-dimensional graphics subroutine libraries; and subroutine libraries for audio and video standards such as MPEG-1, MPEG-2, H.261, H.263, G.728, and G.723.

Data pipeline 220 performs the data switchboard function of cache system 130. Data pipeline 220 is able to create multiple simultaneous data communication paths between IOBUS 180, FBUS 190, general purpose processor 110, vector processor 120 and SRAM block 210 and ROM 150. Similarly, address pipeline 230 performs switchboard functions for addresses. In the embodiment of FIG. 2, IOBUS 180 and FBUS 190 use time multiplexing for address and data signals. Cache control 160 provides the control lines to data pipeline 220 and address pipeline 230 to properly configure the communication channels.

In some embodiments of cache system 130, a transaction-based protocol is used to support all read and write operations. Any unit coupled to cache system 130, such as general processor 110, vector processor 120, or the various devices coupled to IOBUS 180 and FBUS 190, can place a request to cache system 130. Such a request is formed by a device identification code ("device ID") and an address of the requested memory location. Each unit has a distinct device ID and cache system 130 can prioritize the requests based on the device ID of the unit making the request. When the data at the requested address becomes available, cache system responds with the device ID, a transaction identification code ("transaction ID"), the address, and the requested data. If the requested address is not contained in SRAM block 210 or ROM 150, cache system 130 will not be able to respond to the specific request for several clock cycles while the data at the memory address is retrieved. However, while the data of a first request is being retrieved, cache system 130 is able to process a second request from a different unit with a different device ID. This way, pending request will not block subsequent requests from other units. Furthermore, cache system 130 can handle a read request and a write request simultaneously in a single cycle.

As explained above, SRAM block 210 is divided into four memory banks. SRAM block 210 is dual-ported, having read port 216 and write port 214, so that in any cycle, SRAM block 210 can accept one read request and one write request. TAG section 212 of SRAM block 210 must have two read ports to support the simultaneous read and write requests. Thus the address used by read port 216 as well as the address used by write port 214 can be compared with internal cache tags for hit or miss conditions simultaneously. Tag section 212 also contains a separate write port so that as the write request at write port 214 is performed the appropriate tag fields are also changed.

Depending on the constraints of the overall system, cache system 130 can be used with either write-back or write-through cache policies. Furthermore, in some embodiments, to further increase speed, the cache line-size can be made twice the data width. In these embodiments, each cache line must have assigned two valid bits and two dirty bits for "book-keeping" purposes because each cache line contains two vectors. SRAM block 210 should also globally clear all valid bits if a global clear signal is received. In other embodiments, individual clear signals are supported for each bank in SRAM block 210. These and other cache policies are fully described in Jim Handy, "The Cache Memory Book," (1993), which is incorporated herein by reference in its entirety.

Referring again to FIG. 2, address pipeline 230 is coupled to IOBUS 180 and FBUS 190. Address pipeline 230 is further coupled to general purpose processor 110 via address bus 232, vector processor 120 via data address bus 234 and instruction address bus 236 provides addresses to tag memory 212 for hit/miss calculations. Two addresses, a read address and a write address, can be applied to cache tag memory 212 simultaneously. For each address from address pipeline 230, hit/miss calculation logic extracts an index (a read index or a write index) from the address (read address or write address) to identify a tag value in a section 142B, 144B, 172B and 174B. The section of tag memory 212 used depends on the source of the address. Hit/miss calculation logic compares the identified tag value to the most significant bits of the address to determine whether the associated data caches 142A, 144A, 172A and 174A include an entry corresponding to the address.

If there is a hit for the read address, tag memory 212 applies the read index to SRAM 210, and data from the associated cache line is available via read port 216 and data pipeline 220. Address pipeline 230 provides an offset signal derived from the six least significant bits of the address signals which identifies the requested data from within the cache line. If there is a cache miss for the read address, access to external memory is required. A new entry is created in the section 142B, 144B, 172B and 174B of tag memory 212 that corresponds to the source (general purpose processor 110 or vector processor 120) and the type (data or instruction) of the read address signal. No entries are created for addresses from IOBUS 180 or FBUS 190.

If there is a hit for the write address, tag memory 212 routes the write index to SRAM 210. Data from data pipeline 220 can then be written to SRAM 210 via write port 214, and validity bits are set to indicate that the associated cache line is dirty. If there is a cache miss for the write address from processors 110 or 120, a new entry is created before data is written to SRAM 210. The entry created is in the section 144B or 174B of tag memory 212 that corresponds to the source (processor 110 or 120) of the address signal. An analogous procedure may be used for cache accesses to ROM 150.

Figure 3:
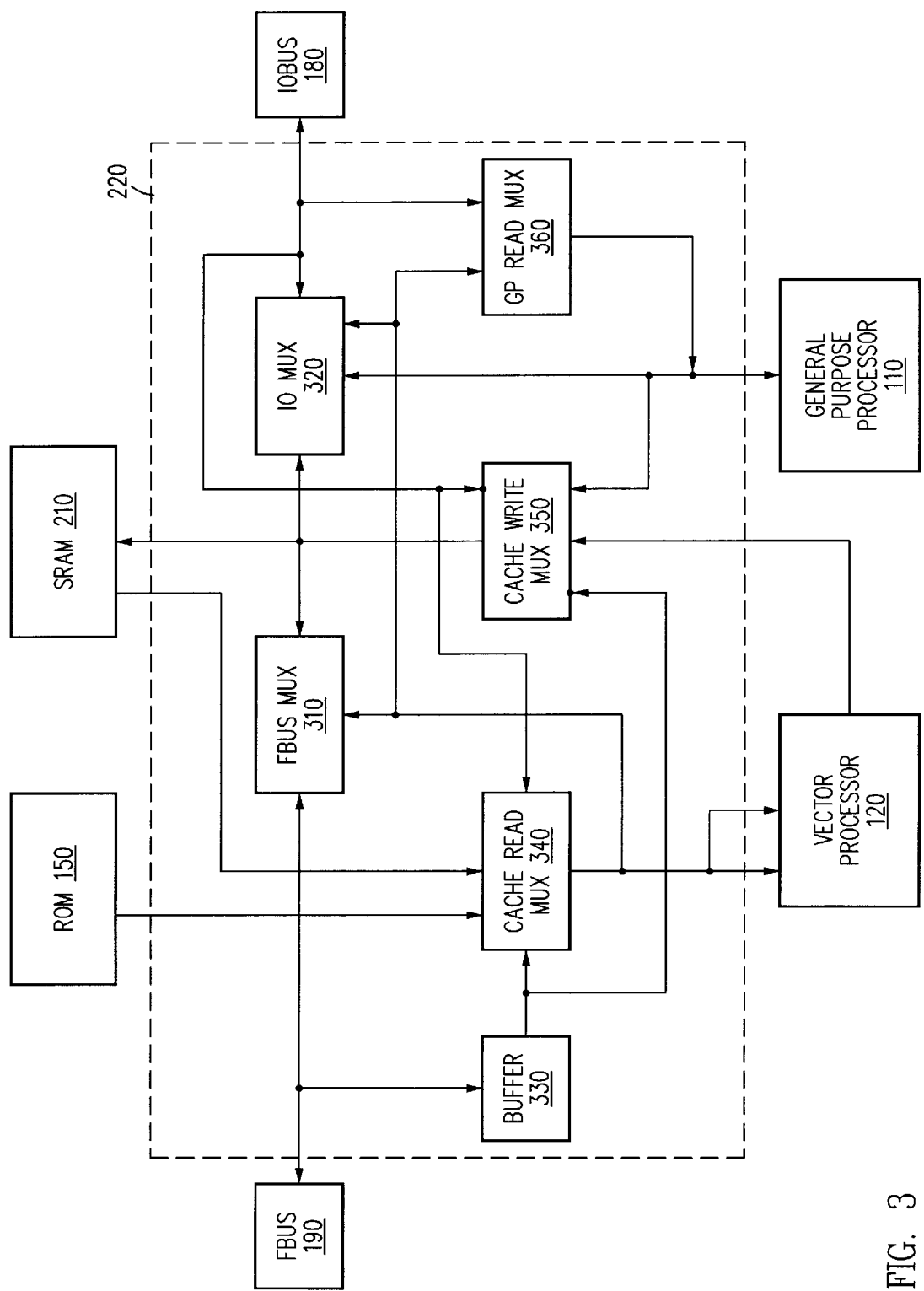
FIG. 3 shows a block diagram of a data pipeline used in a cache system in accordance with an embodiment of the invention.

FIG. 3 is a block diagram of one embodiment of data pipeline 220. As noted, cache system 130 is both a caching system and a switchboard for IOBUS 180, FBUS 190, general purpose processor 110, and vector processor 120. The busses and processor should be able to communicate either through the cache or directly if the cache is being used by another device. The processors are generally faster than the devices on the busses; therefore, the processors will generally use the cache on writes and allow the cache write-back system to place the data to the appropriate bus device. Similarly, the processors generally request information from the cache rather than the devices directly. If the cache does not contain the requested data, the processors typically rely on the cache system to retrieve the requested data into the cache and produce the data to the processors. However, when the cache is busy the processors an access the busses directly.

Data is transferred from general purpose processor 110 to IOBUS 180 through IO MUX 320. Data from IOBUS 180 to general purpose processor 110 passes through GP read MUX 360. Data is transferred from either SRAM block 210 or ROM 150 to general purpose processor 110 through cache read MUX 340 and GP read MUX 360. Data is transferred from general purpose processor 110 to SRAM block 210 through cache write MUX 350. Cache read MUX 340, cache write MUX 350, IO MUX 320 and GP read MUX 360 can be conventional multiplexers and can contain internal latches or registers as necessary for timing constraints. The selection control lines (not shown) of the multiplexers are dictated by cache control unit 160. Data is transferred from general purpose processor 110 to FBUS 190 through cache write MUX 350 and FBUS MUX 310. Data from FBUS 190 to general purpose processor 110 are channeled through buffer 330, cache read MUX 340, and GP read MUX 360. To perform these functions, buffer 330 can be a conventional buffer, latch, or register.

General purpose processor 110 can control vector processor 120 through control lines 112 (FIG. 1). Direct data transfer between general purpose processor 110 and vector processor 120 is generally not required but can be accomplished through SRAM block 210 or any other devices since the two processors share a common memory map.

Data from ROM 150 and SRAM block 210 to IOBUS 180 travels through cache read MUX 340 and IO MUX 320. Data from IOBUS 180 to SRAM block 210 travels through cache write MUX 350. Data from IOBUS 180 to FBUS 190 passes through cache write MUX 350 and FBUS MUX 310. Data for IOBUS 180 from FBUS 190 passes through buffer 330, cache read MUX 340, and IO MUX 320. Data for IOBUS 180 from vector processor 120 passes through cache write MUX 350 and IO MUX 320. Data from IOBUS 180 to vector processor 120 passes through cache read MUX 340. In some embodiments of the invention, the direct pipeline for data from vector processor 120 to IOBUS 180 is eliminated to simplify the design of data pipeline 220. Since the bandwidth of vector processor 120 is much greater than the bandwidth of IOBUS 180, a direct communication path from vector processor 120 to IOBUS 180 becomes very inefficient with respect to processing time of vector processor 120.

Data for FBUS 190 from SRAM block 210 and ROM 150 passes through cache read MUX 340 and FBUS MUX 310. Data from FBUS 190 to SRAM block 210 passes through buffer 330 and cache write MUX 350. DATA from FBUS 190 can directly reach vector processor 120 through buffer 330 and cache read MUX 340. Data for FBUS 190 can also come directly from vector processor 120 through cache write MUX 350 and FBUS MUX 310.

Data from vector processor 120 travels to SRAM block 210 through cache write MUX 350. Data from SRAM block 210 and ROM 150 passes through cache read MUX 340 to vector processor 120.

Figure 4:
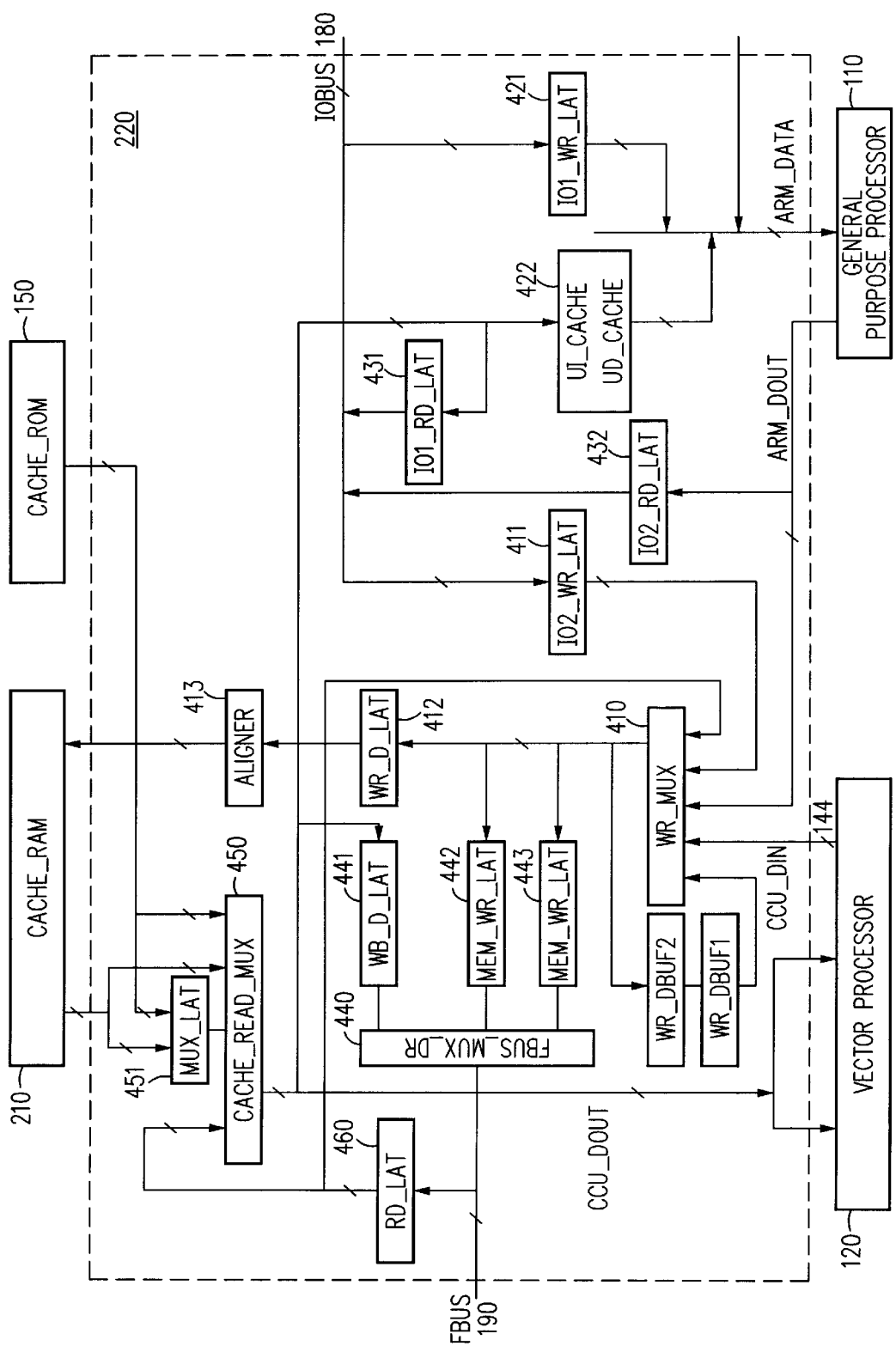
FIG. 4 shows a block diagram of a data pipeline used in a cache system in accordance with an embodiment of the invention.

FIG. 4 is a detailed block diagram of a second embodiment of data pipeline 220. Since the functionality of the embodiment of FIG. 4 is similar to the functionality of the embodiment of FIG. 3, only the differences between the embodiments are discussed in detail. However, the general organizations of the elements in each embodiment is also described. In FIG. 4, cache read MUX 340 is replaced by cache read MUX 450 and MUX latch 451. Buffer 330 is replaced with read latch 460. FBUS MUX 310 is replaced by FBUS MUX 440, write back (WB) data latch 441, memory write latch 442, and memory write latch 443. The latches in the embodiment of FIG. 4, are used to pipeline the data pipeline. Cache write MUX 350 is replaced with Cache write MUX 410, write data latch 412, aligner 413, and IO write latch 411. IO MUX 320 is replaced by IO read latch 431 and IO read latch 432. GP read MUX 360 is replaced with IO write latch 421, and microcache 422.

Microcache 422 couples the main cache, SRAM block 210 and ROM 150, to general purpose processor 110. Microcache 422 is divided into a micro-instruction cache and a micro-data cache, each of which includes a tag portion 522 (FIG. 5), tag comparators, and valid bits. Microcache 422 works as a pre-fetch buffer. The address of a request from general purpose processor 110 is first compared with tag portion 522 of microcache 422. If a microcache miss occurs (i.e. no match within microcache tag 522) the address of the request with the address and other control information is sent to the main cache. To simplify microcache 422, data writes from general purpose processor 110 which matches a tag in microcache 422 invalidates the microcache address so that the written data must be sent to the main cache. In this way cache coherence can be maintained without complex write back or write through designs on microcache 422.

Figure 5:
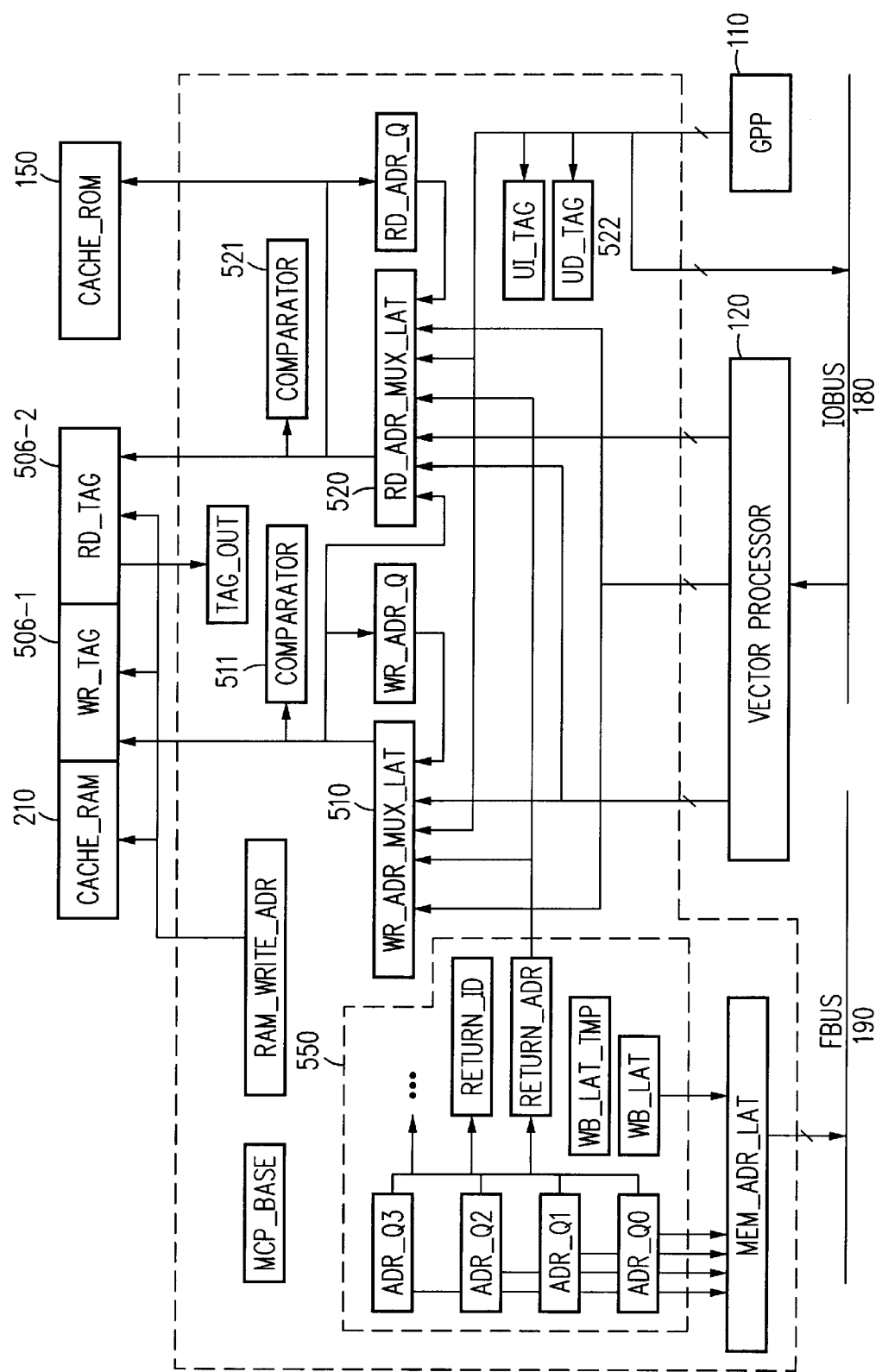
FIG. 5 shows a block diagram of an address pipeline used in a cache system in accordance with an embodiment of the invention.

FIG. 5 shows a block diagram of one embodiment of address pipeline 230. FBUS interface 550 is composed of a four entry address queue and a write back latch. FBUS interface 550 can simultaneously support a pending read from instruction cache 262, a pending read from instruction cache 142, a write request from data cache 144, and a write-back request from data cache 144. The addresses for write requests are sent to write address MUX 510, while the addresses for read requests are sent to read address MUX 520. Cache control unit 160 (FIG. 2) performs arbitration between requests from general purpose processor 110, vector processor 120, IOBUS 180, and FBUS 190 based on the device ID of the request. Cache control unit 160 then configures the various multiplexers of data pipeline 220 and address pipeline 230 to handle the requests. Arbitration scheme can be decided based on estimation of the importance of each device. Typically, general purpose processor 110 is given the highest priority. As explained above cache system 130 is capable of simultaneous read and write operations. Therefore, separate comparators are necessary for the read and write requests. Comparator 511 is used to compare the write address from write address MUX 510 with the addresses received through write tag port 506-1 to determine if the write address of the current request is in the cache. If the address is in the cache, the cache is updated with the new data at the matching cache location. If the address is not in the cache, the address and data is written to the cache in an unused cache location or the location least recently accessed. Eventually the data is sent to the proper direct mapped device using write back or write through cache techniques.

Comparator 521 is used to compare the read address of read requests from read address MUX 520 and the addresses received through read tag port 506-2. If a tag matches the read address, the data associated with the TAG is sent to the requesting device using data pipeline 220. As explained above, if the transaction protocol is used the data will be returned with a device ID, a transaction ID, and the requested address. If no tags match the read address, cache system 130 must retrieve the requested data from the appropriate direct memory mapped device. When the requested data is retrieved, the requested data, the device ID, the transaction ID, and the address is sent to the requesting device. While the data for a first request is being retrieved, cache system 130 is able to service a second read request so that a second device requiring the cache is not blocked by the first device.

A general purpose processor 110 read request is first sent to the micro-instruction cache of microcache 422. The micro-instruction cache is provided between general purpose processor 110 and SRAM 210. As noted, microcache 422 is provided in data and address pipelines 220 and 230. Micro-instruction tag and micro-data tag are provided in the tag portion 522 of address pipeline 230. Micro-instruction cache RAM and micro-data cache RAM are provided in data pipeline 220. The request address is compared with the micro-tags of the respective microcache RAM. If an address match is found, the request is serviced by microcache 422. That is, for a read request, if there is a microcache hit, the requested data is read from the micro-data cache and provided to general purpose processor 110 by cache control unit 160. When a microcache miss occurs, the read request is sent to cache control unit 160.

A general purpose processor 110 write request is sent directly to the cache control unit 160. Microcache 422 coherency is provided by invalidating the data in microcache 422 at the respective address of the write request. Neither write-through nor write-back capability is provided for microcache 422.

Cache control unit 160 arbitrates the requests from all devices making a request. In the preferred embodiment, general purpose processor 110 has the highest priority because general purpose processor 110 rarely requests a cache access because of microcache 422. Cache control unit 160 grants cache access requests unless a multiple cycle request or an address queue full condition occurs. In the preferred embodiment, when a multiple cycle request or address queue full condition occurs, cache control unit 160 enters an internal hold cycle and grants no cache access requests.

In the preferred embodiment, cache system 130 is operated in the following three stages of pipeline cycles: request cycle, tag cycle, and data cycle. In the cache hit case, cache system 130 is capable of returning instructions or data in every cycle.

Cache control unit 160 performs arbitration among general purpose processor 110, vector processor 120, FBUS 190, and IOBUS 180 for cache SRAM access. Cache control unit 160 monitors the bus requests from these four masters and grants the bus to the winner with a specific identification number. Cache control unit 160 also generates the cache address bus and read/write control signals to access the cache and do the tag comparison.

If there is a cache hit, the bus master which wins the arbitration will be able to access cache 210 for read/write operations. If there is a cache miss, cache control unit 160 will serve the next bus master which makes a request without waiting for the missing data from the first operation to come back from the main memory. So, the bus master which has a cache miss has to keep the identification number in order to receive the data from the pending but stalled transaction. A line fetch will be performed to get the data from the main memory. The line size is defined as 64 bytes, so cache control unit 160 will execute 8 consecutive memory accesses (64 bits each) to get the data from the main memory to cache 210. When the first requested data is returned to the cache from the main memory, cache control unit 160 will send a grant signal to the missing-data bus master with the same identification number. This bus master may accept the data or ignore the data.

Figure 6:
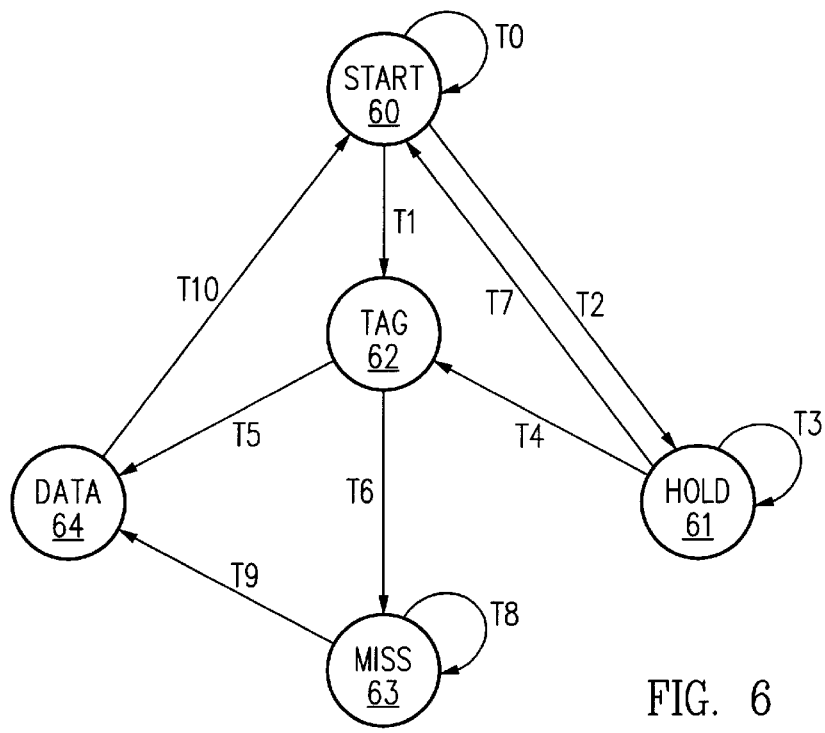
FIG. 6 shows a state diagram of a cache control unit and processor interface in accordance with an embodiment of the invention.

Cache control unit 160 accepts requests from various units including general purpose processor 110, vector processor 120 and devices on IOBUS 180 and FBUS 190. For example, referring to FIG. 6, cache control unit 160 interfaces with general purpose processor 110 according to a general purpose processor interface state machine. Specifically, cache control unit 160 starts control in start state 60 if there are no requests, read data has been returned, or a write request without a hold. While in start state 60, cache control unit 160 waits for requests from general purpose processor 110.

General purpose processor 110 asserts a request signal and a read/write signal to cache control unit 160 at the beginning of a first clock. If the cache is not busy, cache control unit 160 will grant the request by the end of the first clock. Cache control unit 160 will grant the request by driving a grant signal and assigning a request identification number to the granted request. In the preferred embodiment, a ten bit request ID is driven to the requester. If the upper 4 bits of the request ID match the unit ID of the requester, the request is granted. The requester should latch the lower 6 bits of the request ID since it is the transaction ID associated with the request. If a request is granted, the requester should drive address and other control information such as data type to cache control unit 160.

When start state 60 is the present state and no requests are made, the next state is start state 60. When start state 60 is the present state and cache control unit 160 receives and grants a request for a read or a write but revokes the grant with a hold (e.g., the cache is busy processing another cache request), the next state is hold state 61. When start state 60 is the present state and cache control unit 160 receives and grants a general purpose processor 110 request for a read or a write, the next state is tag state 62.

While in hold state 61, cache control unit 160 has granted a request and assigned the request a request ID. If the cache is busy processing another cache transaction, cache control unit 160 will hold the cache request with a hold signal. If the cache control unit's hold signal is not asserted by the end of the second clock, the request is fully taken by cache control unit 160 and the requested data will be returned during a later cycle. However, if the cache control unit hold signal is asserted, the requester should keep driving the address and control information as if the granted request in the first clock is revoked. In the next cycle, the same request need not be made again because the previous request ID information is still valid. The hold signal will be constantly asserted during the first clock until it is deasserted by cache control unit 160 during the second clock. The cache control unit hold signal is a timing critical signal. It is used to inform the requester that cache control unit 160 is busy handling other things in the present cycle and the granted request can not be processed yet.

When hold state 61 is the present state and the cache is busy but capable of accepting more requests, the next state is start state 60. This allows cache system 130 to continue accepting cache requests. When hold state 61 is the present state and no further requests are capable of being accepted by cache subsystem 130, the next state is hold state 61. When hold state 61 is the present state and the cache is ready to process the next request, the next state is tag state 62.

While in tag state 62, cache control unit 160 checks the cache tags for an address match. Cache control unit 160 will use the address and a bank select signal to make line selection from one of the cache banks (e.g., general purpose or vector) for the tag read. Whether a tag hit occurs or not will be known toward the end of the second clock. The data will be returned in the next cycle for the hit case. Address queue status is also evaluated in this cycle. A tag miss or an almost full address queue condition will force a read hold of cache control unit 160. Cache control unit 160 will not handle any new read request, but will retry the aborted tag compare. Additionally, because each cache line (64B) contains two vectors, the accessing vector's valid bit should be valid in order to get a tag hit. For double vector (64B) data read, both valid bits have to be valid in order to get tag hit.

When tag state 62 is the present state and no address match is found (that is, a cache miss occurs), the next state is miss state 63. When tag state 62 is the present state and an address match is found (that is, a cache hit occurs), the next state is data state 64.

While in miss state 63, cache control unit 160 sends a refill request to the system memory. If there is tag miss in the tag cycle and the address queue is not full, cache control unit 160 will start a cache line fetch by posting the missing address, id information and other control information into the four entry address queue during the first clock. Presently, each address queue contains about 69 bit of information. During the second clock, memory address latch will be loaded so FBUS request can be made in the next first clock.

When miss state 63 is the present state and the cache has not yet been refilled, the next state is miss state 63. The cache control-general processor interface state machine remains in miss state 63 until the cache has been refilled from the main memory. When miss state 63 is the present state and the cache has been refilled, the next state is data state 64.

While in data state 64, the read data is returned to cache control unit 160. Cache control unit 160 drives the read data to the requesting device, in this case general purpose processor 110. Data will be driven with the low 16B driven in the first clock and the high 16B driven in the second. For a 64B data request, one additional cycle is used to finish the transfer. Cache control unit 160 will always drive the request ID one half cycle early (second clock) to inform the requester that data will be returned in the following first clock. The requester should always compare the request ID for the proper returned data. In addition, a tag hit is also used as an indication of returned data. When data state 64 is the present state, the next state is start state 60.

Figure 7:
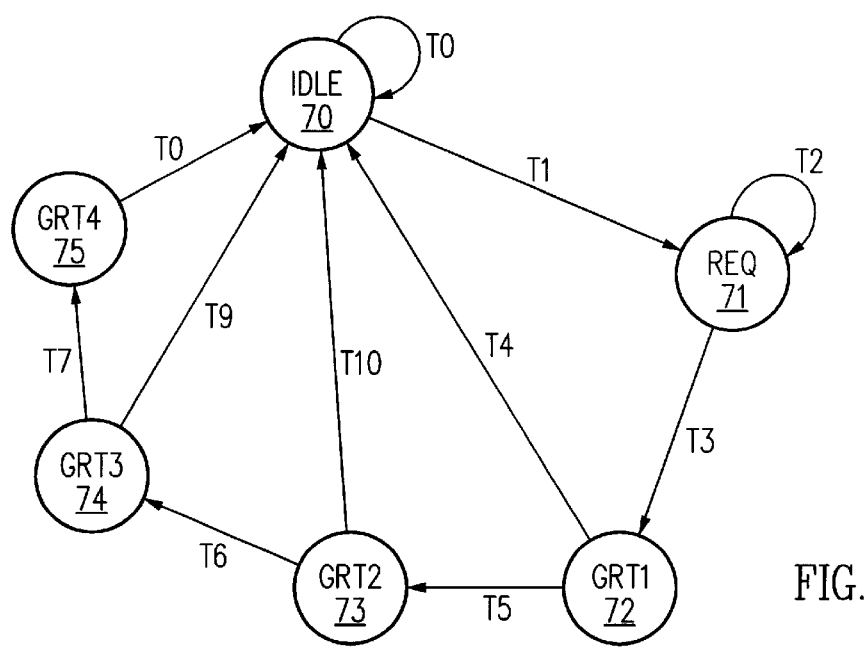
FIG. 7 shows a state diagram of a cache control unit and bus interface in accordance with an embodiment of the invention.

Referring to FIG. 7, cache control unit 160 interfaces with FBUS 190 according to an FBUS interface state machine. The cache control unit requests access to FBUS 190, e.g., in the case of a cache miss during a cache access by general purpose processor 110 described above. Specifically, cache control unit starts control in idle state 70. When idle state 70 is the present state and no requests have been received, the next state is idle state 70. When a cache miss occurs, cache control unit must perform a refill from the main memory via FBUS 190. Therefore, when idle state 70 is the present state and a cache miss occurs, the next state is request state 71.

While in request state 71, cache control unit 160 makes a read or write request to the FBUS arbiter. When request state 71 is the present state and cache control unit 160 has not been granted access to FBUS 190 (e.g., if the FBUS is busy), the next state is request state 71. When request state 71 is the present state and cache control unit 160 has been granted access to FBUS 190, the next state is first greater state 72.

While in first greater state 72, cache control unit 160 is granted access for an 8 byte read or write. The smallest access is 8 bytes. When first greater state 72 is the present state and the grant size is 8 bytes, the next state is idle state 70. When first greater state 72 is the present state and the grant size is greater than 8 bytes, the next state is second greater state 73.

While in second greater state 73, cache control unit is granted access for another 8 bytes to total 16 bytes. When second greater state 73 is the present state and the grant size is 16 bytes, the next state is idle state 70. When second greater state 73 is the present state and the grant size is greater than 16 bytes, the next state is third greater state 74.

While in third greater state 74, cache control unit is granted access for another 8 bytes to total 24 bytes. When third greater state 74 is the present state and the grant size is 24 bytes, the next state is idle state 70. When third greater state 74 is the present state and the grant size is greater than 24 bytes, the next state is fourth greater state 75.

While in fourth greater state 75, cache control unit is granted access for another 8 bytes to total 32 bytes. While in fourth greater state 75, data is being driven for the last cycle. When fourth greater state 75 is the present state, the next state is idle state 70.

Figure 8:
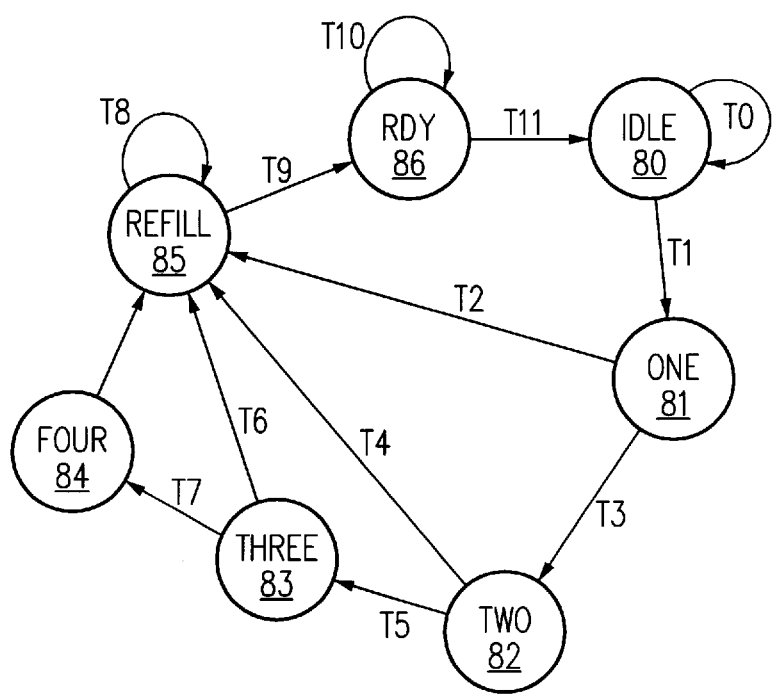
FIG. 8 shows a state diagram of a data receiver state machine in accordance with an embodiment of the invention.

Referring to FIG. 8, a state diagram shows a data receiver state machine detailing the receipt of data by data pipeline 220 from FBUS 190 for cache refill and transfer to general processor 110 or vector processor 120. Specifically, data pipeline 220 starts control in idle state 80. When idle state 80 is the present state and FBUS 190 is not ready to drive data to cache system 130, the next state is idle state 80. When idle state 80 is the present state and FBUS is ready to drive data to cache system 130, the next state is first receive state 81. The transition from idle state 80 to first receive state 81 occurs after FBUS has received a memory request and has serviced that request. Consequently, the transition may occur any number of cycles after the initial request for the respective data occurred and was granted.

While in first receive state 81, data pipeline 220 receives a first set of 8 bytes from FBUS 190 over Fdata<63:0>. When first receive state 81 is the present state and the grant size is 8 bytes, the next state is refill state 85. When first receive state 81 is the present state and the grant size is greater than 8 bytes, the next state is second receive state 82.

While in second receive state 82, data pipeline 220 receives a second set of 8 bytes from FBUS 190 over Fdata<63:0>. When second receive state 82 is the present state and the grant size is 16 bytes, the next state is refill state 85. When second receive state 82 is the present state and the grant size is greater than 16 bytes, the next state is third receive state 83.

While in third receive state 83, data pipeline 220 receives a third set of 8 bytes from FBUS 190 over Fdata<63:0>. When third receive state 83 is the present state and the grant size is 24 bytes, the next state is refill state 85. When third receive state 83 is the present state and the grant size is greater than 24 bytes, the next state is fourth receive state 84.

While in fourth receive state 84, data pipeline 220 receives a fourth set of 8 bytes from FBUS 190 over Fdata<63:0>. When fourth receive state 84 is the present state and all groups of bytes have been received from FBUS 190, the next state is refill state 85.

While in refill state 85, data pipeline 220 refills the cache line of SRAM 210 that was requested by a requesting device such as general purpose processor 110. When refill state 85 is the present state, the next state is ready state 86.

While in ready state 86, data pipeline 220 is ready to return the data to the requesting device. The requesting device with the proper transaction ID may access the data. When ready state 86 is the present state and the requesting processor has not yet read the requested data, the next state is ready state 86. When ready state 86 is the present state and the requesting processor has read the requested data, the next state is idle state 80.

Figure 9:
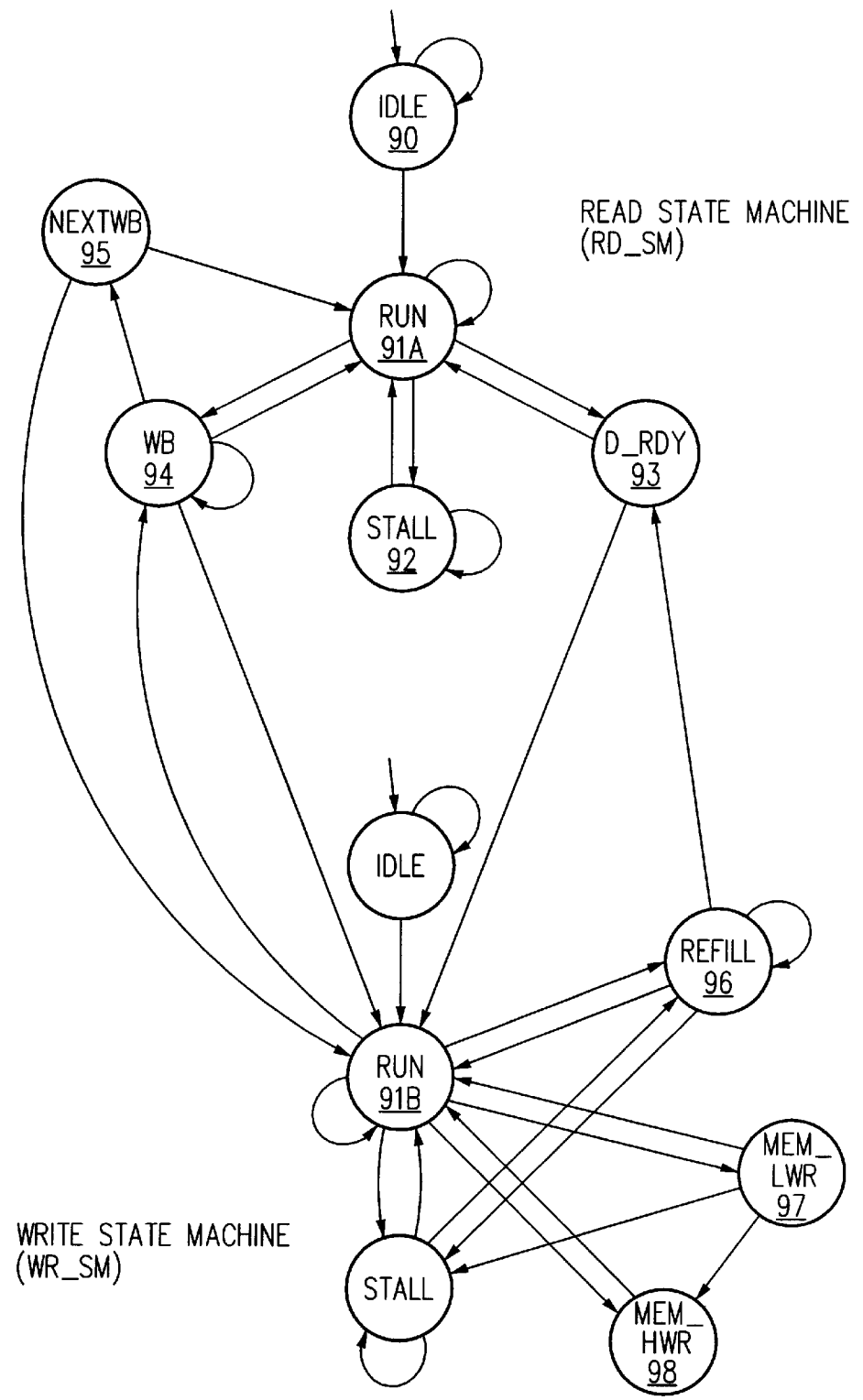
FIG. 9 shows a state diagram of a read/write state machine in accordance with an embodiment of the invention.

Referring to FIG. 9, a state diagram shows the states of cache control unit 160 during read and write accesses to the cache system 130. Specifically, cache system 130 starts control in idle state 90, e.g., after a system reset. When idle state 90 is the present state and no cache access is made or a cache access is made but is revoked, the next state is idle state 90. When idle state 90 is the present state and a cache access is made and the access is granted without being revoked by the cache control unit 160 hold signal, the next state is run state 91.

While in run state 91, cache system 130 receives addresses from requesting devices and checks TAG section 212 for a match with the addresses. While in run state 91, cache control unit can accept a plurality of requests. For example, if a cache read request results in a cache miss, the cache transitions to refill state 96 and requests the data for the address from the main memory. While the main memory responds over FBUS, the cache returns to run state 91 to accept and service other cache requests.

When run state 91A is the present state and a clean read miss occurs, the next state is stall state 92. When run state 91A is the present state and a cache read hit occurs, the next state is data ready state 93. When run state 91A is the present state and a cache read hit to a dirty line occurs, the next state is write back state 94.

When run state 91B is the present state and a cache write miss occurs, the next state is write refill state 96. When run state 91B is the present state and a cache write hit occurs, the next state is low write state 97 if an external memory write is accessing a low vector location. When run state 91B is the present state and a cache write hit occurs, the next state is high write state 98 if an external memory write is accessing a high vector location.

While in stall state 92, the cache control unit is stalled. Specifically, more resources are needed to service a cache request (read or write operation). The address is saved and all new read grants are revoked. When stall state 92 is the present state and no new requests may be processed, the next state is stall state 92. When stall state 92 is the present state and the stall condition is removed, the next state is run state 91.

While in data ready state 93, cache system 130 drives requested data to the requesting device. For example, after a data cache hit or after a cache refill, the requested data is driven with the request transaction ID to be received by the appropriate requesting device. When data ready state 93 is the present state, the next state is run state 91.

While in write back state 94, the first dirty vector is written back. As mentioned, cache control unit 160 will accept write requests from various units during the first clock. The requester will assert a request signal, a read/write signal, and vector type early during the first clock. By the end of the first clock, cache control unit 160 will grant one of these write requests. The write grant to different units is done by asserting a grant signal to the requesting unit directly. There is no need for the request unit to receive a request ID from cache control unit 160 because no data will be returned. In the second clock, the requester should supply the address and data type. As in the read case, cache control unit 160 might assert the hold signal near the end of the second clock to inform the requester that although the grant has been given, it can not be processed at the present cycle. The requesting device should keep driving the address and the data type information until the hold signal is de-asserted. During the following cycle, requester will supply the write data.

The requester should start driving the data to cache control unit 160 with the lower 16 bytes in the first clock and the upper 16 bytes in the second clock. For a 64 byte data transfer, requester will take one additional cycle to drive data. Cache control unit 160 has an internal write data latch to hold this data. Whether this write hits the cache (takes one or two cycles for actual writing data into cache) or misses the cache (may take quite a few cycle to write data), the requester may now consider that write as finished.

For a write miss with a dirty cache line, cache control unit 160 will first copy out the dirty line. Since the dirty data is not available yet, cache control unit 160 will assert hold to the grant logic so that no new read or write request will be granted. It will then start an internal read, using the dirty line address to fetch the dirty cache line data. Eventually, the write back address and data will go out to the memory.

When write back state 94 is the present state and the write back buffer is full, the next state is write back state 94. When write back state 94 is the present state and run state 91A was the previous state (i.e., dirty cache read hit), the next state is run state 91B and the second next state is refill state 96. When write back state 94 is the present state and run state 91B was the previous state (i.e., write miss), the next state is run state 9. When write back state 94 is the present state and the write request is for greater than 32 bytes, the next state is next write back state 95.

While in next write back state 95, the next dirty vector is written back. When next write back state 95 is the present state, the next state is run state 91.

While in refill state 96, cache controller sends a refill request to main memory. During a cache refill, if the data type is 32B and line is clean (both vectors are clean), cache control unit 160 will simply over-write the existing line with the new tag and new data. It will also mark the accessing vector as valid and dirty while leaving the other vector in the same line as invalid. If the data type is less than 32B, this becomes the partial data write. This partial data will be kept on a temporary register. Cache control unit 160 will fetch the missing half line (32B) from memory and load it into the cache. The partial data will then be written into the cache line with the proper byte enable signals. For a write miss with a dirty cache line, cache control unit 160 will first copy out the dirty line. Since the dirty data is not available yet, cache control unit 160 will assert hold to the grant logic so that no new read or write request will be granted. It will then start an internal read, using the dirty line address to fetch the dirty cache line data. Eventually, the write back address and data will go out to the memory.

When refill state 96 is the present state and, there is a cache miss pending or the address queue is full the next state is stall state 92. Refill state 96 is the present state and, a write is pending and the buffer to the memory is not full the next state is data ready state 93. Otherwise, the next state is run state 91.

While in low write state 97, the write is loaded to the address queue for external memory write. When low write state 97 is the present state and the FBUS receiver data is not ready, the next state is high write state 98.

While in high write state 98, the write is loaded to the address queue for external memory write. When high write state 98 is the present state, the next state is run state 91.

Appendix 1 sets forth a version of the read/write state machine of FIG. 9.

While the invention has been described with reference to various embodiments, it will be understood that these embodiments are illustrative and that the scope of the invention is not limited to them. Many variations, modifications, additions, and improvements of the embodiments described are possible in accordance with the invention as claimed. Those skilled in the art will recognize that alternative embodiments may be implemented in agreement with the present invention. For example, in view of this disclosure, those skilled-in-the-art can define within the scope of the present invention other implementations of data pipelines, switchboards, address pipelines, cache systems, multiplexers, latches, buses, processors, and use these alternative features to create a digital signal processor. Further, those skilled in the art will recognize that boundaries between logic blocks are merely illustrative and that alternative embodiments may merge logic blocks or impose an alternate decomposition of functionality for cache system 130 including data and address pipelines 220 and 230, cache 140, 170 and cache control unit 160. Moreover, alternative embodiments may combine multiple instances of a particular component. These and other variations, modifications, additions, and improvements may fall within the scope of the invention as defined in the claims which follow.

Appendix I

```
/*
*=============================================================
* File: ccu_sm.v
*
* Path: /users/pai/mcp/verilog/mike22/CCU/ccu_sm.v
*
* Description: This module contains the two main state machines for
*              the Cache Controller Unit:
*
*              1. The rd state machine
*              2. The wr state machine
*
* Engineer: Yet-Ping Pai, Sung Park
*
* rev1.10   8/19/96
*
* Copyright (C) 1996 Samsung Semiconductor Inc.
*=============================================================
*/ module ccu_sm (sys_reset1, clk1, clk2, mclk, // global
        adr_q_full, ccu_rd_hold_2, ccu_wr_hold_2, rd_hold_sm, wr_hold_sm,
        ccu_wr_grant, cc_off_rd, cc_off_wr, rd_sm_d_rdy,
        rd_sm_wb, rd_sm_nextwb, no_lstwb,
        mem_wr_lat_v, p_wr_save, vec_rd, vec_wr, vec_rd_save, vec_wr_save,
        rd_stall, wr_stall, wr_sm_mem_rd, wr_sm_mem_lwr, wr_sm_refill,
        true_rd_miss, true_wr_miss, d_sm_rdy, rd_lat_refill_req,
        idc_rd_hit, idc_wr_hit, rd_dirty, wr_dirty,
        rd_hvec, wr_hvec, ld_wb_adr_lat, v_wb_data, sel_rep_rdadr, flip_bit
        sel_cc_rd_lat, ld_wb_data_lat_1, ld_wb_data_lat_2, //data
        d_hrd, d_lrd, d_hwr, d_lwr // idc
// SPARK
, rd_sm_stall, wr_sm_stall, d_sm_idle, write_back
, wr_sm_run, cc_rd_lat_rdy, ld_wb_lat
, ccu_sm_test_mode
, ccu_sm_sclka, ccu_sm_sclkb, ccu_sm_scan_in, ccu_sm_scan_out
); // sm // SPARK
input       ccu_sm_test_mode;
input       ccu_sm_sclka;
input       ccu_sm_sclkb;
input       ccu_sm_scan_in;
output      ccu_sm_scan_out;

output      rd_sm_stall;
output      wr_sm_stall;
output      wr_sm_run;
output      d_sm_idle;
input       write_back;

// Global signals
input       sys_reset1;
input       clk1;
input       clk2;
input       mclk;

// ccu_ctl interface signals
input       adr_q_full;        // adr_q has none or only one position avail
input       rd_hold_sm;        // sm asserts rd_hold
output      wr_hold_sm;        // sm asserts wr_hold
input       ccu_rd_hold_2;     // final ccu hold
input       ccu_wr_hold_2;     // final ccu hold
input       ccu_rd_grant;      // rd request is granted, but subject to lcc
input       ccu_wr_grant;      // wr request is granted, but subject to lcc
input       cc_off_rd;         // Any cache-off rd operation
input       cc_off_wr;         // Any cache-off wr operation
output      cc_rd_lat_rdy;     // cc_rd_lat data is ready
input       rd_sm_wb;
output      rd_sm_nextwb;
input       mem_wr_lat_v;      // Indicate the mem_wr_lat is full
                               // Write Back buffer is full
input       v_wb_data;         // The master only writes partial data (<32
input       p_wr_save;         // into the cache
input       vec_rd;            // doing vec rd, a 2cycle signal
input       vec_wr;            // doing vec wr, a 2cycle signal
input       vec_rd_save;       // doing vec rd, a 3cycle signal
input       vec_wr_save;       // doing vec wr, a 3cycle signal
input       rd_hvec;           // rd is for high half vector
input       wr_hvec;           // wr is for high half vector
input       rd_stall;          // rd_stall when adrq or v_wb_data is not at
input       wr_stall;          // wr_stall when adrq or v_wb_data is not at input       true_rd_miss;
input       true_wr_miss;
output      d_sm_rdy;
output      rd_lat_refill_req;
output      wr_sm_mem_lwr;     // wr_sm state
output      wr_sm_mem_hwr;     // wr_sm state
output      wr_sm_refill;      // wr_sm state
input       wb_lvec;           // wb low vector
input       wb_hvec;           // wb high vector
input       no_lstwb;
input       wb_next_vec;       // need to wb both vectors
output      wb_nextwb_save;    // delayed rd_sm_nextwb // ccu_adr_dp interface signals
input       idc_rd_hit;        // The tag is matched for idc read port add
input       idc_wr_hit;        // The tag is matched for idc write port ad
input       rd_dirty;          // The dirty bit is set for cache read
output      wr_dirty;          // The dirty bit is set for cache write
output      ld_wb_adr_lat;     // load wb address latch in wb state
output      sel_rep_rdadr;
output      flip_bits;

// ccu_data_dp interface signals
output      sel_cc_rd_lat;     // selct cc_rd_lat
output      ld_wb_data_lat_1;  // load wb data latch in wb state
```

```verilog
output          ld_wb_data_lat_2;  // load wb data latch in wb state
output          ld_wb_lat;

// ldc interface signals
input           d_hrd;             // dirty bit
input           d_lrd;             // dirty bit
input           d_hwr;             // dirty bit
input           d_lwr;             // dirty bit // real registers or latch
reg  rd_sm states:
reg             rd_sm_idle;
reg             rd_sm_run;
reg             rd_sm_d_rdy;
reg             rd_sm_wb;
reg             rd_sm_nextwb;
reg             rd_sm_stall;

// wr_sm states:
reg             wr_sm_idle;
reg             wr_sm_run;
reg             wr_sm_refill;
reg             wr_sm_mem_lwr;
reg             wr_sm_nextwb_save;
reg             wr_sm_wr_update;
reg             wr_sm_lwb;
reg             wr_sm_hwb;
reg             wr_sm_p_wr_save;
reg             wr_sm_stall;

//
reg             ld_rdstall_lat;
reg             ld_wb_lat_dly;
reg             rd_sm_nextwb_q;
reg             rd_sm_nextwb_save;
reg             write_back_q;
reg             write_back_save;

reg   [2:0]     rd_st;
reg   [2:0]     wr_st;
reg   [2:0]     rd_st_next;
reg   [2:0]     wr_st_next;

// SBPARK
reg             true_wr_miss_save;
reg             true_wr_miss_save2;
reg             wb_hvec_save;
reg             wb_lvec_save;

// declaration register
//              reset;                          // buffered sys_resetl
wire            ld_wb_data_lat_1;
wire            ld_wb_data_lat_2;

// wire declaration
wire            next_rd_sm_idle;
wire            next_rd_sm_run;

wire            next_rd_sm_d_rdy;
wire            next_rd_sm_wb;

// SBPARK
wire            next_rd_sm_wb_save;
wire            next_rd_sm_wb_save_2;

wire            next_rd_sm_nextwb;
wire            next_rd_sm_stall;

wire            T1;
wire            T2;
wire            T3;
wire            T4;
wire            T4A;
wire            T4B;
wire            T5;
wire            T6;
wire            T7;
wire            T8;
wire            T9;
wire            T10;
wire            T10A;
wire            T11;
wire            T12;
wire            T13;
wire            T20;
wire            T21;
wire            T22;
wire            T23;
wire            T24;
wire            T27;
wire            T28;
wire            T29;
wire            T30;
wire            T31;
wire            T32;
wire            T33;
wire            T34;
wire            T35;
wire            T36;
wire            T37;
wire            T38;
wire            T39;
wire            T40;
wire            T50;

wire            ld_rd_adrq;
wire            ld_rd_stall_lat;
wire            sel_rd_stall_adr;
wire            rd_d_lat_drive;
wire            p_wr_save;
wire            ld_wr_adrq;
wire            ld_wr_stall_lat;
wire            sel_wr_stall_adr;

wire            next_wr_sm_idle;
wire            next_wr_sm_run;
wire            next_wr_sm_refill;
```

```
wire                     next_wr_sm_mem_hwr;
wire                     next_wr_sm_mem_lwr;
wire                     next_wr_sm_wr_update;
wire                     next_wr_sm_lwb;
wire                     next_wr_sm_hwb;
wire                     next_wr_sm_p_wr_save;
wire                     next_wr_sm_stall;

wire                     ccu_rd_hold_2;
wire                     ccu_wr_hold_2;
//wire                   sel1_cc_rd_lat;
wire                     cc_rd_lat_rdy;
wire                     cc_rd_lat_rdy_reset;
wire                     sel_rep_rdadr;
wire                     flip_bit5;

wire                     clk1_dd;

assign reset = ~sys_reset1;             // 2/15/96 ypp

//*****************************************************
//  start of the RD STATE MACHINE (rd_sm)
//*****************************************************
//
// rd_sm:  rd_sm_idle, rd_sm_run, rd_sm_d_rdy, rd_sm_wb, rd_sm_nextwb,
//         rd_sm_stall
//
// rd_sm_idle:    Entered after reset.
// rd_sm_run :    Cache can accept rd operation.
// rd_sm_d_rdy:   Drive return data back to the requester.
// rd_sm_wb:      Write back the first dirty vector
// rd_sm_nextwb:  Write back the next dirty vector
// rd_sm_stall:   Need more resource to service the rd operation.
//                Save the address and revoke any new rd grant.

// next state assignment
//
assign next_rd_sm_idle   = T1  | reset;
reg    next2_rd_sm_run   = (T2 | T5 | T7 | T10 | T10A | T11) & !reset;
reg    next2_rd_sm_d_rdy = (T3 | T39)                        & !reset;
reg    next2_rd_sm_wb    = (T4 | T4B | T40)                  & !reset;
reg    next2_rd_sm_nextwb = T4A
reg    next2_rd_sm_stall = (T6 | T13)                        & !reset;

//
always #1
if (clk2)
begin
   next2_rd_sm_idle  = next_rd_sm_idle;
   next2_rd_sm_run   = next_rd_sm_run;
   next2_rd_sm_d_rdy = next_rd_sm_d_rdy;
   next2_rd_sm_wb    = next_rd_sm_wb;
   next2_rd_sm_nextwb = next_rd_sm_nextwb;
   next2_rd_sm_stall = next_rd_sm_stall;
   next2_rd_sm_nextwb = next_rd_sm_nextwb;
   next2_rd_sm_stall  = next_rd_sm_stall;
end
// current state assignment
always @(posedge clk1)
begin
   rd_sm_idle   = next2_rd_sm_idle;
   rd_sm_run    = next2_rd_sm_run;
   rd_sm_d_rdy  = next2_rd_sm_d_rdy;
   rd_sm_wb     = next2_rd_sm_wb;
   rd_sm_nextwb = next2_rd_sm_nextwb;
   rd_sm_stall  = next2_rd_sm_stall;
end // rd_sm outputs //wire wr_miss = true_wr_miss | true_wr_miss_save;

reg   wb_lvec_save_tmp;
reg   wb_hvec_save_tmp;
reg   wb_lvec_save2;
reg   wb_hvec_save2;
reg   true_wr_miss_save1;

always @(posedge clk1)
begin
   true_wr_miss_save = true_wr_miss;
   true_wr_miss_save1 = true_wr_miss_save2;
   wb_lvec_save_tmp  = wb_lvec;
   wb_hvec_save_tmp  = wb_hvec;
   wb_lvec_save2     = wb_lvec_save;
   wb_hvec_save2     = wb_hvec_save;
end
//
always @(posedge clk2)
begin
   true_wr_miss_save2 = true_wr_miss_save;
   wb_lvec_save = wb_lvec_save_tmp;
   wb_hvec_save = wb_hvec_save_tmp;
end //assign rd_sm_hold_sm = 1'b0;          = T4 | T4A | rd_sm_wb | rd_sm_nextwb;
//assign sel_cc_rd_lat                  = T4 | T4A | rd_sm_wb | rd_sm_nextwb;  // aligner selects cc_rd_lat // generate wb latch load signals
//
reg rd_sm_wb_q, rd_sm_wb_nextwb
// delay rd_sm_nextwb
always @(posedge clk2)
always @(posedge clk1)
// delay once
always @(posedge clk1)
always @(posedge clk2)
//
always @(posedge clk1)                  rd_sm_wb_q       = rd_sm_wb;
always @(posedge clk1)                  rd_sm_wb_save    = rd_sm_wb_q;

rd_sm_nextwb_q    = rd_sm_nextwb;
                                        rd_sm_nextwb_save = rd_sm_nextwb_q;

write_back_q    = write_back;
                                        write_back_save = write_back_q;
```

```
// ypp  8/9/96
/// true wr_miss needs to reaccess idc so ld_wb_lat is asserted one cycle
/// late in rd_sm_wb, but it is normal in rd_sm_nextwb.

// no wb in rd_sm state, but do wb in rd_sm_nextwb state

// add no_1stwb term    ypp  8/9/96
wire    ld_wb_lat   = ((true_wr_miss | true_wr_miss_save2 | true_wr_miss_save1)?
            (rd_sm_wb_save & (wb_lvec_save2) & "no_1stwb) | rd_sm_nextw
            (rd_sm_wb & (wb_lvec_save_tmp) & "no_1stwb) | rd_sm_next // generate delayed version
always #1
if (clk2)       ld_wb_lat_dly = ld_wb_lat;

reg ld_wb_lat_dly2;

always #1
if (clk1)       ld_wb_lat_dly2 = ld_wb_lat_dly;

//assign ld_wb_adr_lat = ld_wb_lat & "ld_wb_lat_dly;

wire ld_wb_adr_lat = ld_wb_lat & "ld_wb_lat_dly & clk1;
//(rd_sm_wb & (write_back | write_back_save)?
//     ld_sm_wb & clk1 & lwrite_back & ld_wb_lat_dly: ld_wb_lat &
//     "ld_wb_lat_dly);

// change to qualifier only 2/14/96 ypp
//reg ld_wb_data_lat_1, ld_wb_data_lat_2;

reg reset_dly;

always @(posedge clk1)
reset_dly = reset;

// try to fix clocking problem by delaying the set clock
// need to think more here  4/18/96
assign #1 clk1_dd = clk1;    // clk1_dd is a delayed clk1 for lns // 4/18/96 ypp
//rs_ff d338 (ld_wb_data_lat_1, ld_wb_lat, clk2);

/*
rs_ff d338 (ld_wb_data_lat_1, ld_wb_lat & clk1_dd, clk2);
rs_ff d339 (ld_wb_data_lat_2, ld_wb_lat & clk2, clk1);
*/ assign ld_wb_data_lat_1 = ld_wb_lat & clk1 & "ld_wb_lat_dly;
assign ld_wb_data_lat_2 = ld_wb_lat & clk2 & "ld_wb_lat_dly2;

/*
assign ld_wb_data_lat_1 = ld_wb_lat & clk1;
assign ld_wb_data_lat_2 = ld_wb_lat & clk2;
*/

//assign ld_wb_data_lat_1 = ld_wb_lat & "ld_wb_lat_dly;
//assign ld_wb_data_lat_2 = ld_wb_lat & "ld_wb_lat_dly;

// ram_rd_adr will select the repeat address with bits flipped.
/// This is always true in enterring rd_sm_nextwb
assign sel_rep_rdadr = T4A;
// change "clk1 -> clk2   2/14/96 ypp
assign flip_bits    = T4A & ld_wb_lat;
//(rd_sm_wb & (true_wr_miss | true_wr_miss_save | true_wr_miss_save2)?
//T4A & ((true_wr_m_miss & clk1) | (true_wr_miss_save & clk2)) : T4A);

//assign ld_rd_adrq        = T4;                     // clean or dirty miss
assign ld_rd_stall_lat = rd_sm_stall;
assign sel_rd_stall_adr= T6 | rd_sm_stall;

assign rd_d_lat_drive   = T3;

/// define state transition signals T1, T2, ..., etc.
///
/// A) rd_sm_idle :
///    rd_sm_idle is only entered once with reset.
///
//  a) rd_sm_idle -> rd_sm_idle:
//     No request, or request is granted but is revoked later.
assign T1 = rd_sm_idle & (!ccu_rd_grant | (ccu_rd_grant & ccu_rd_hold_2));

//  b) rd_sm_idle -> rd_sm_run:
//     The request is granted without being revoked by ccu_rd_hold_2.
assign T2 = rd_sm_idle & ccu_rd_grant & !ccu_rd_hold_2;

/// rd_stall is generated in ccu_ctl.v
/// If there is clean rd miss but adr_q_full, or dirty rd miss but adr_q_full
/// or wb_data_lat is full, stall the rd access and try again.
assign rd_stall = true_rd_miss & (adr_q_full | (v_wb_data & rd_dirty));

// B) rd_sm_run :
//
//  a) rd_sm_run -> rd_sm_run conditions:
//     Stay in rd_sm_run state whether there is rd request or not.
//     There is no memory data ready
//     The RD MISS DIRTY doesn't occur
//     The address queue is not full assign T5 = rd_sm_run & (!adr_q_full & !(wb_lvec | wb_hvec | wb_next_vec)
//assign T5 = rd_sm_run & (!adr_q_full & !(wb_lvec | wb_hvec)
            & !cc_rd_lat_rdy);

//  b) rd_sm_run -> rd_sm_d_rdy conditions:
//     When data from memory is fully loaded in the cc_rd_lat, and is done
//     with cache refill if it is not cc_off_rd, this data will be driven to
//     lsu, ifu, or ARW7. The cache read which is about to enter will be put
//     on hold by asserting ccu_rd_hold_2.
//
//     cc_rd_hold is really used to create an empty cycle to handle
//     the extra work associated with driving rd_d_lat data or write-back
//     the dirty data.
```

```
//       The empty cycle is called rd_sm_d_rdy if cc_rd_lat_rdy happens. It can
//       also be called rd_sm_stall if rd_stall happens.

assign T3 = rd_sm_run & cc_rd_lat_rdy & !rd_stall;
//       assign T3 = rd_sm_run & cc_rd_lat_rdy & !rd_stall & !(idc_rd_hit & rd_di //  c)   rd_sm_run -> rd_sm_wb conditions:
//       This state is entered when there is need to do wb, whether the present
//       vec needs to do it or not.
//       1. cc_rd_lat_rdy is not asserted,
//       2. rd_access_results in a dirty miss
//       3. write back buffer and adrq are not full.
//       Assert cc_rd_hold before going into rd_sm_wb state. Also assert no_rd_gr
//       in arbitor logics while in rd_sm_wb and rd_sm_nextwb in order to concent
//       on servicing wb.

assign T4  = rd_sm_run & (wb_lvec | wb_hvec | wb_next_vec) & !adr_q_full
//       assign T4  = rd_sm_run & (wb_lvec | wb_hvec | wb_next_vec) & !adr_q_full
                    & !v_wb_data & !cc_rd_lat_rdy ;  //1130

//  e)   rd_sm_wb -> rd_sm_nextwb conditions:
//       This state is entered for doing the next vec wb
//       the first vector wb is complete (v_wb_data ='b0), and adr_q is not full.
//       1. write back buffer and adrq are not full.
//       Assert cc_rd_hold before going into rd_sm_wb state. May waive this
//       condition in future.

//       assign T4A = rd_sm_wb & wb_next_vec & !v_wb_data & !cc_rd_lat_rdy;
         assign T4A = rd_sm_wb & wb_next_vec & !v_wb_data & !cc_rd_lat_rdy
//    add this terms to disable T4A while T4B is high ypp 8/2/96
                    & ~(true_wr_miss | true_wr_miss_save2);

//  f)   rd_sm_wb -> rd_sm_wb conditions:
//       Stay in rd_sm_wb since v_wb_data is full.
//       Wait for the first vector wb to complete (v_wb_data ='b0), and adr_q is
//       1. write back buffer and adrq are not full.

assign T4B = (rd_sm_wb & wb_next_vec & v_wb_data) | (rd_sm_wb & (true_wr_n
                    | (true_wr_miss_save2)) ;

//  g)   rd_sm_run -> rd_sm_stall conditions:
//       rd_sm_stall basically will store the ram_rd_adr to a temporary
//       latch, and try again in the next cycle to do cache tag access.
//       Many conditions can result into this state.
//       1. rd clean miss and the address queue is full.
//       2. rd dirty miss and the write back buffer is full, or
//          cc_off_rd but the address queue is full
//       The stall will load the rd stall latch for retry, and
//       the assertion of cc_hold. This is needed to prevent another
//       stalled rd operation while servicing the 1st stalled rd assign T6 = rd_sm_run & (rd_stall | (cc_off_rd & adr_q_full)) &
                     !cc_rd_lat_rdy;

//  C)   rd_sm_d_rdy :

//    a) rd_sm_d_rdy -> rd_sm_d_rdy conditions:
//       stays in rd_sm_d_rdy as more cc_rd_lat_rdy comes in.
//       It is not possible to get into rd_sm_wb or rd_stall states.

//assign T8 = rd_sm_d_rdy & cc_rd_lat_rdy;

//    d) rd_sm_d_rdy -> rd_sm_run conditions:
//       Always go back to rd_sm_run before doing something else.
//       rd_sm_run can accept new rd address now. If there is pending
//       stalled rd operation it will be handled first.

assign T7 = rd_sm_d_rdy;

//  D)   rd_sm_wb :

//    a) rd_sm_wb -> rd_sm_nextwb conditions:
//       if wb_next_vec_save does not exist assign T10 = rd_sm_wb & ~wb_next_vec_save;

//    b) rd_sm_nextwb -> rd_sm_run conditions:
//       always goes back to rd_sm_run.

assign T10A = rd_sm_nextwb;

//    c) rd_sm_wb -> rd_sm_d_rdy conditions:
//       The address queue is full assign T10 = rd_sm_wb & cc_rd_lat_rdy;

//  E)   rd_sm_stall :
//       In general, the stall state will be entered only once to
//       re-submit the stalled ram_rd_adr. In this state, the arbitor will
//       not grant any other rd request.

//    a) rd_sm_stall -> rd_sm_run conditions:
//       Retry the stalled rd to see if the conditions which cause the
//       stall have changed // SBPARK
         assign T11 = rd_sm_stall & !adr_q_full;

//    b) rd_sm_stall -> rd_sm_d_rdy conditions:

assign T12 = rd_sm_stall & cc_rd_lat_rdy;

// SBPARK rd_sm_stall -> rd_sm_stall
         assign T13 = rd_sm_stall & adr_q_full;

//*****************************************************
// end of the RD STATE MACHINE (rd_sm)
//*****************************************************

//*****************************************************
```

```
// start of the WRITE STATE MACHINE (wr_sm)
//****************************************************
// wr_sm: wr_sm_idle, wr_sm_run, wr_sm_refill, wr_sm_mem_hwr,
//        wr_sm_mem_lwr,
//        wr_sm_wr_update, wr_sm_wb, wr_sm_p_wr_save, wr_sm_stall
//
// wr_sm_idle:       entered after reset
// wr_sm_run :       cache can accept new wr operation.
// wr_sm_refill:     cache refill write
// wr_sm_mem_hwr:    load wr to adr_q for external memory write (cc_off_wr only)
// wr_sm_mem_lwr:    load wr to adr_q for external memory write (cc_off_wr only)
// wr_sm_wr_update:  clean miss write, write to data, tag, etc (like doing refil
// wr_sm_lwb:        copy out the dirty cache data
// wr_sm_hwb:
// wr_sm_p_wr_save:  write only partial data to cache.
// wr_sm_stall:      The wr operation needs resources which can not be
//                   satisfied. Save this address to try again and revoke
//                   any new wr which was granted earlier in the cycle. .

// next state assignment
//
assign next_wr_sm_idle       = reset;
assign next_wr_sm_run        = (T7 | T10A | T10| T21 | T22 | T31 | T32 | T33 |
assign next_wr_sm_refill     = (T23 | T37) & !reset;
assign next_wr_sm_mem_hwr    = (T27 | T29) & !reset;
assign next_wr_sm_mem_lwr    = T28
assign next_wr_sm_wr_update  = 1'b0;       // !reset;
assign next_wr_sm_lwb        = 1'b0;       // !reset;
assign next_wr_sm_hwb        = 1'b0;       // !reset;
assign next_wr_sm_p_wr_save  = 1'b0;       // !reset;
assign next_wr_sm_stall      = (T34 | T30 | T35 | T38) & !reset;
                             = (T34) & 1'b0; // !reset;

// current state assignment
reg    next2_wr_sm_idle       ;
reg    next2_wr_sm_run        ;
reg    next2_wr_sm_refill     ;
reg    next2_wr_sm_mem_hwr    ;
reg    next2_wr_sm_mem_lwr    ;
reg    next2_wr_sm_wr_update  ;
reg    next2_wr_sm_lwb        ;
reg    next2_wr_sm_hwb        ;
reg    next2_wr_sm_p_wr_save  ;
reg    next2_wr_sm_stall      ;

always #2
if (clk2)
begin
  next2_wr_sm_idle       = next_wr_sm_idle;
  next2_wr_sm_run        = next_wr_sm_run;
  next2_wr_sm_refill     = next_wr_sm_refill;
  next2_wr_sm_mem_hwr    = next_wr_sm_mem_hwr;
  next2_wr_sm_mem_lwr    = next_wr_sm_mem_lwr;
  next2_wr_sm_wr_update  = next_wr_sm_wr_update;
  next2_wr_sm_lwb        = next_wr_sm_lwb;
  next2_wr_sm_hwb        = next_wr_sm_hwb;
  next2_wr_sm_p_wr_save  = next_wr_sm_p_wr_save;
  next2_wr_sm_stall      = next_wr_sm_stall;
end
// always @(posedge clk1)
begin
  wr_sm_idle       = next2_wr_sm_idle;
  wr_sm_run        = next2_wr_sm_run;
  wr_sm_refill     = next2_wr_sm_refill;
  wr_sm_mem_hwr    = next2_wr_sm_mem_hwr;
  wr_sm_mem_lwr    = next2_wr_sm_mem_lwr;
  wr_sm_wr_update  = next2_wr_sm_wr_update;
  wr_sm_lwb        = next2_wr_sm_lwb;
  wr_sm_hwb        = next2_wr_sm_hwb;
  wr_sm_p_wr_save  = next2_wr_sm_p_wr_save;
  wr_sm_stall      = next2_wr_sm_stall;
end // wr_sm inputs
//
assign cc_rd_lat_rdy = !mclk & d_sm_rdy;

// wr_sm outputs
//
assign wr_hold_sm           = 'b0;                            // T3 | T4 | T6;

//assign ld_wb_adr_lat       = rd_sm_wb;
//assign ld_wb_data_lat      = rd_sm_wb;
assign ld_wr_adrq           = T4;                              // clean or dirty miss
assign ld_wr_stall_lat      = rd_sm_stall;
assign ld_wr_stall_adr      = T6 | rd_sm_stall;
//assign sell_cc_rd_lat      = wr_sm_refill;                   // aligner selects cc_rd_lat
assign sel_cc_rd_lat        = rd_sm_d_rdy;
assign cc_rd_lat_rdy_reset  = rd_sm_d_rdy;

// Define state transition signals T20, T21, ......, etc.
//
// A) wr_sm_idle:
//    wr_sm_idle is entered with reset only.
//
//    a) wr_sm_idle -> wr_sm_idle conditions:
//         No wr request, or request is granted but is revoked later.
//
//         assign T20 = wr_sm_idle & (!ccu_wr_grant | (ccu_wr_grant & ccu_wr_hold_2)
//
//    b) wr_sm_idle -> wr_sm_run conditions:
//         The request is granted without being revoked by ccu_wr_hold_2.
//
//         assign T21 = wr_sm_idle;
//         assign T21 = wr_sm_idle & ccu_wr_grant & !ccu_wr_hold_2;
//
//    wr_stall is generated in ccu_ctl.v
//    wr_stall = true_wr_miss & adr_q_full
//
// B) wr_sm_run:
//
//    a) wr_sm_run -> wr_sm_run conditions:
//         Stays in wr_sm_run whether there is wr request or not.
//         1. Refill data is not ready.
//         2. No wr_stall
//         3. No cc_off_wr
```

```
//       (clean miss while the adr_q is full)
         assign T22 = wr_sm_run
                  & !rd_lat_refill_req
                  & !wr_stall                              // no received memory data
                  & !cc_off_wr                             // no wr miss & adrq is full
                  //& (!adr_q_full & !(wb_lvec | wb_next_vec)
                  & (!adr_q_full & !(wb_lvec | wb_hvec)
                  & !cc_rd_lat_rdy );

//    b) wr_sm_run -> wr_sm_refill conditions:
//       Data returned from memory is loaded into cc_rd_lat.
//       Need one extra cycle to align data and write data
         assign T23 = wr_sm_run & rd_lat_refill_req & !cc_off_wr & !wr_stall;

//       rd_sm_wb -> wr_sm_refill
//assign T50 = rd_sm_wb & rd_lat_refill_req & !cc_off_wr ;

//    // SBPARK wr_sm_refill -> wr_sm_refill
         assign T37 = wr_sm_stall & rd_lat_refill_req ;

//    // SBPARK wr_sm_refill -> rd_sm_d_dry
         assign T39 = wr_sm_refill & d_sm_rdy & !wr_stall ;

//    c) wr_sm_run -> wr_sm_wr_update conditions:
//       wr_sm_wr_update will do the idc write with data in the wr_d_lat[287:0]
//       Not doing cc_rd_lat_rdy write.
//       No cache off wr, since it will use the same wr_d mux
//       It is a full data write to idc ram, resulted from a clean wr miss.
//       Partial data write will be
//       handled differently.
         assign T24 = wr_sm_run & !cc_off_wr & vec_wr & !cc_rd_lat_rdy & !p_wr_save;

//    d) wr_sm_run -> wr_sm_p_wr_save conditions:
//       1. There is no data ready for RD MISS
//       2. There is no cache off wr
//       3. It is a WRITE PARTIAL DATA and MISS but NOT DIRTY
//       4. The address queue is not full
//       5. There is no READ MISS or CACHE-OFF RD operation
         assign T25 = wr_sm_run & !cc_off_wr & !(!idc_wr_hit & !wr_dirty & !wr_dirty & p_wr_sav.
                  !adr_q_full & !(!idc_rd_hit | cc_off_rd);

//    e) wr_sm_run -> wr_sm_wb conditions:
//       There no data ready for RD MISS
//       There is no cache off wr
//       It is a WRITE DATA and MISS and DIRTY
//       The address queue is full or
//       There is no READ MISS or CACHE-OFF RD operation assign T26 = !cc_off_wr & v_wb_data & (!idc_wr_hit & wr_dirty &
                  (adr_q_full | !(!idc_rd_hit | cc_off_rd));
//    SBPARK
         assign T40 = wr_sm_run & rd_sm_run & write_back & !adr_q_full
                  & !v_wb_data & !cc_rd_lat_rdy ;

//    f) wr_sm_run -> wr_sm_mem_hwr conditions:
//       wr_sm_mem_hwr is used to do external memory write and is accessing
//       the hvec location.
//       1. The FBUS receiver data is not ready yet.
//       2. cc_off_wr needs to place the req into address queue, and the
//             adr_q is not full.
//       3. wr address is high vec (ram_wr_adr[5]='b1)
//       4. mem_wr_lat is not full
//       The mem_wr Buffer is not occupied. added on 5.23.95
         assign T27 = wr_sm_run & cc_off_wr & wr_hvec & !mem_wr_lat_v
                  & !adr_q_full & !cc_rd_lat_rdy;

//    f1) wr_sm_run -> wr_sm_mem_lwr conditions:
//       wr_sm_mem_wr is used to do external memory write and is accessing
//       the lvec location
//       1. The FBUS receiver data is not ready yet.
//       2. cc_off_wr needs to place the req into address queue, and the
//             adr_q is not full.
//       3. wr address is low vec (ram_wr_adr[5]='b0)
//       4. mem_wr_lat is not full
//       The mem_wr Buffer is not occupied. added on 5.23.95
         assign T28 = wr_sm_run & cc_off_wr & !wr_hvec & !mem_wr_lat_v
                  & !adr_q_full & !cc_rd_lat_rdy;

//    f2) wr_sm_mem_lwr -> wr_sm_mem_hwr conditions:
//       wr_sm_mem_wr is used to do external memory write
//       1. The FBUS receiver data is not ready yet.
//       2. cc_off_wr needs to place the req into address queue, and the
//             adr_q is not full.
//       3. vec_wr='b1
//       No need to check for cc_off_wr or mem_wr_lat_v.
         assign T29 = wr_sm_mem_lwr & vec_wr & !adr_q_full & !cc_rd_lat_rdy;

//    g) wr_sm_run -> wr_sm_stall conditions:
//       1. There is no data ready for RD MISS
//       2. There is cache off wr but the address queue is full
//       or the mem_wr Buffer is occupied. added on 5.23.95
//       3. There is WRITE FULL DATA and MISS but NOT DIRTY. But
//             the memory data is ready for cache refill.
//       4. It is a WRITE DATA and MISS and DIRTY but either
//             the Write Buffer is occupied or a READ MISS or
//             CACHE-OFF RD operation is occurring
//       5. It is a WRITE PARTIAL DATA and MISS but NOT DIRTY
//             operation. And either the address queue is full or
//             there is a READ MISS or CACHE-OFF RD operation assign T30=  wr_sm_run & adr_q_full;
//assign T30= !(T22 | T23 | T24 | T27);

/*       else if ((cc_off_wr & (!mem_wr_lat_v |
                  adr_q_full & (!idc_rd_hit | cc_off_rd)) | (!v_wb_data |
                  (!cc_off_wr & !wr_dirty & !wr_dirty |
                  (!idc_rd_hit & rd_dirty)) | !adr_q_full
                  (cc_off_wr & !idc_wr_hit & !idc_wr_hit
```

```
                                        (adr_q_full | (!idc_rd_hit & rd_dirty))))
    //  h) wr_sm_run -> wr_sm_idle conditions:
    //       1. There is no data ready for RD MISS
    //       2. There is no cache off wr
    //       3. The wr DATA is a HIT
    //       4. There is no request for wr // c) wr_sm_refill:
    //    a) wr_sm_refill -> wr_sm_stall conditions:
    //       1. There is a wr DATA MISS pending or
    //       2. There is a cache-off wr operation but either
    //          the address queue is full or there is a READ
    //          MISS or cache-off rd operation
    //          or the mem_wr Buffer is occupied. added on 5.23.95
    //       if ((cc_off_wr & (!mem_wr_lat_v |
    //            adr_q_full | (!idc_rd_hit | cc_off_rd))) |
    //            (!cc_off_wr & !idc_wr_hit))

//    b) wr_sm_refill -> wr_sm_mem_wr conditions:
    //       1. There is a cache-off wr operation and the
    //          address queue is not full and there is no READ
    //          MISS or cache-off rd operation
    //          and the mem_wr Buffer is not occupied. added on
    //          5.23.95

//       else if (cc_off_wr & mem_wr_lat_v &
    //            !adr_q_full & (!(!idc_rd_hit | cc_off_rd)))
    //       */
    //    c) wr_sm_refill -> wr_sm_run conditions:
            assign T31 = wr_sm_refill & !adr_q_full;

// D) wr_sm_mem_wr:
    //    a) wr_sm_mem_wr -> wr_sm_stall conditions:
    //       // The Memory Unit hasn't accepted the wr data
    //
    //       else if ((cc_off_wr & !idc_wr_hit)

//    b) wr_sm_mem_wr -> wr_sm_run conditions:
    //       Always goes back to wr_sm_run, since only one cycle slot is needed.
            assign T32 = wr_sm_mem_lwr & !vec_wr & !adr_q_full;

//    b) wr_sm_mem_hwr -> wr_sm_run conditions:
    //       Always goes back to wr_sm_run, since only one cycle slot is needed.
            assign T33 = wr_sm_mem_hwr & !adr_q_full;

//    b) wr_sm_mem_lwr -> wr_sm_stall conditions:
    //       The adr_q is full at this cycle, stay here until it is available again
            assign T34 = wr_sm_mem_lwr & adr_q_full & vec_wr;
    /*
```

```
    //    c) wr_sm_mem_wr -> wr_sm_idle conditions:
    //       // The Memory Unit already accepted the wr data
    //       // There is no request for wr // E) wr_sm_wr_update:
    //    a) wr_sm_wr_update -> wr_sm_run conditions:
    //       // There is a request for wr
    //
    //       else if ((cc_grant & cc_wr)

//    b) wr_sm_wr_update -> wr_sm_idle conditions:
    //       // There is no request for wr // F) wr_sm_wb:
    //    a) wr_sm_wb -> wr_sm_wr_update conditions:
    //       it is a wr FULL DATA and MISS and DIRTY
    //
    //       else if ((!idc_wr_hit & wr_dirty & !p_wr_save)

//    b) wr_sm_wb -> wr_sm_p_wr_save conditions:
    //       1. It is a wr FULL DATA and MISS and DIRTY
    //       2. The address queue is not full
    //       3. There is no read miss or cache off read operation
    //
    //       else if ((!idc_wr_hit & wr_dirty & p_wr_save &
    //            !adr_q_full & !(!idc_rd_hit | cc_off_rd))

//    c) wr_sm_wb -> wr_sm_stall conditions:
    //       1. It is a wr FULL DATA and MISS and DIRTY
    //       2. The address queue is full or
    //       3. There is a read miss or cache off read operation
    //
    //       else if ((!idc_wr_hit & wr_dirty & p_wr_save &
    //            adr_q_full | (!idc_rd_hit | cc_off_rd))

// G) wr_sm_p_wr_save:
    //    a) wr_sm_p_wr_save -> wr_sm_run conditions:
    //       There is a request for wr
    //
    //       else if ((cc_grant & cc_wr)

//    wr_sm_p_wr_save -> wr_sm_idle conditions:
    //    There is no request for wr // H) wr_sm_stall:
    //    a) wr_sm_stall -> wr_sm_wr_update conditions:
    //       1. There is no data ready for RD MISS
    //       2. There is no cache off wr
    //       3. It is a wrITE FULL DATA and MISS but NOT DIRTY
    //
    //       else if ((cc_off_wr & (!idc_wr_hit & !wr_dirty & !p_wr_save))

//    b) wr_sm_stall -> wr_sm_wb conditions:
```

```
         //  1. There is no cache off wr
         //  2. It is a wrITE DATA and MISS and DIRTY
         //  3. The address queue is full or
         //  4. There is no READ MISS or CACHE-OFF RD operation else if (!idc_wr_hit & wr_dirty & v_wb_data & !cc_off_wr &
                  (adr_q_full | !(!idc_rd_hit | cc_off_rd)))

//  c)  wr_sm_stall -> wr_sm_p_wr_save conditions:
         //  1. There is no cache off wr
         //  2. It is a wrITE PARTIAL DATA and MISS
         //  3. The address queue is not full
         //  4. There is no READ MISS or CACHE-OFF RD operation
         //  5. The Write Back Buffer is not occupied else if (!idc_wr_hit & p_wr_save & !cc_off_wr &
                  !adr_q_full & !(!idc_wr_hit & wr_dirty & v_wb_data)
                  !adr_q_full & !(!idc_rd_hit | cc_off_rd))

//  d)  wr_sm_stall -> wr_sm_mem_wr conditions:
         //  1. There is a cache off wr
         //  2. The address queue is not full
         //  3. There is no READ MISS or CACHE-OFF RD operation else if (cc_off_wr & !adr_q_full &
                  !(!idc_rd_hit | cc_off_rd)) T20 = 1'b0;

//  e)  wr_sm_stall -> wr_sm_stall conditions:
         //  1. The address queue is full
         //  2. There is a READ MISS or CACHE-OFF RD operation //*****************************************************
// end of the WRITE STATE MACHINE (wr_sm)
//*****************************************************
//  e)  wr_sm_stall -> wr_sm_stall conditions:
         assign T35 = wr_sm_stall & adr_q_full;

// wr_sm_stall -> wr_sm_run
         assign T36 = wr_sm_stall & ladr_q_full;

// wr_sm_refill -> wr_sm_stall
         assign T38 = wr_sm_refill & adr_q_full & d_sm_idle;

endmodule
```

What is claimed is:

1. A method for controlling a cache, the cache being coupled to a device, the method comprising:

receiving by a cache controller a first cache request from the device;

providing by the cache controller a first request ID value corresponding to the first cache request to the device after receiving the first cache request;

initiating processing of the first cache request after receiving the first cache request;

receiving by the cache controller a second cache request from the device after receiving the first cache request;

providing by the cache controller a second request ID value corresponding to the second cache request to the device after receiving the second cache request;

initiating processing of the second cache request after receiving the second cache request; and completing the processing of the first and second cache requests after receiving the second cache request.

2. The method of claim 1 wherein the providing by the cache controller the first request ID value includes providing a first unit ID identifying the device; and
providing a first transaction ID uniquely distinguishing the first cache request from other cache requests; and the providing by the cache controller the second request ID value includes providing a second unit ID identifying the device; and
providing a second transaction ID uniquely identifying the second cache request from other cache requests.

3. A cache system comprising:

a cache for temporarily storing information; and a cache control unit comprising:

access control logic for receiving and executing a plurality of cache accesses by a cache accessing device;

identification logic for assigning request identification information uniquely identifying each of the plurality of cache accesses, and for providing the request identification information to the cache accessing device, the identification logic capable of providing the request identification information prior to execution of the plurality of cache accesses by the access control logic; and result logic for providing the request identification information and information requested by the cache accessing device to the cache accessing device if the cache access was a read.

4. The cache system of claim 3 wherein the cache comprises:

a store array having a plurality of lines for temporarily storing information; and a tag array having a plurality of tag locations for storing a corresponding plurality of tags, the plurality of tag locations corresponding to the plurality of lines of the store array, each tag location storing a tag indicating an address of the information stored in a corresponding line of the store array.

5. The cache system of claim 4 wherein the store array further comprises:

an instruction store array having a plurality of lines for temporarily storing instruction information; and a data store array having a plurality of lines for temporarily storing data information; and wherein the tag array further comprises:

an instruction tag array having a plurality of instruction tag locations for storing a corresponding plurality of instruction tags, the plurality of instruction tag locations corresponding to the plurality of lines of the instruction store array, each instruction tag location storing an instruction tag indicating an address of the information stored in a corresponding line of the instruction store array; and a data tag array having a plurality of data tag locations for storing a corresponding plurality of data tags, the plurality of data tag locations corresponding to the plurality of lines of the data store array, each data tag location storing a data tag indicating an address of the information stored in a corresponding line of the data store array.

6. The cache system of claim 3 wherein the cache further comprises: an instruction cache for temporarily storing instruction information; and a data cache for temporarily storing data information.

7. The cache system of claim 3 wherein the cache system is for providing temporary storage for a first device and a second device, the cache further comprising:

an instruction store array having a plurality of lines for temporarily storing instruction information for use by the first device;

an instruction store array having a plurality of lines for temporarily storing instruction information for use by the second device;

a data store array having a plurality of lines for temporarily storing data information for use by the first device; and a data store array having a plurality of lines for temporarily storing data information for use by the second device;

a plurality of tag arrays corresponding to the instruction and data store arrays, the plurality of tag arrays having a plurality of tag locations for storing a corresponding plurality of tags, the plurality of tag locations corresponding to the plurality of lines of the instruction and data store arrays, each tag location storing a tag indicating an address of the information stored in a corresponding line of the instruction and data store arrays.

8. The cache system of claim 3 wherein the cache system is for providing temporary storage for a plurality of devices, wherein the cache is an N-way cache, N being the number of devices in the plurality, the cache further comprising:

an instruction bank for each of the plurality of devices, the instruction bank having a plurality of lines for temporarily storing instruction information for use by each of the plurality of devices;

a data bank for each of the plurality of devices, the data bank having a plurality of lines for temporarily storing data information for use by each of the plurality of devices; and a tag array for each of the plurality of devices, the tag array having a plurality of tag locations for storing a corresponding plurality of tags, the plurality of tag locations corresponding to the plurality of lines of the corresponding instruction and data banks, each tag location storing a tag indicating an address of the information stored in a corresponding line of the corresponding instruction and data banks.

9. The cache system of claim 3, wherein the access control logic executes each of the plurality of cache requests in a plurality of pipeline stages, the access control logic temporarily waiting to execute a stage of a first cache request while executing a stage of a second cache request received after the first cache request.

10. The cache system of claim 3 wherein the cache accessing device is a first device of a plurality of cache accessing devices, the plurality of cache accessing devices including the first device and a second device;

the cache is for temporarily storing information for at least the first and second devices of the plurality of cache accessing devices;

the access control logic is for receiving and executing a plurality of cache accesses by the first and second devices;

the identification logic is for providing the request identification information to a corresponding each one of the first and second devices providing each cache access; and the result logic is for providing the request identification information and the information requested by each one of the first and second device to a corresponding one of the first and second devices for each cache read.

11. The cache system of claim 10 wherein the access control logic includes:

receiving logic for receiving cache requests from the first device and a second device;

grant logic for granting access to the cache by the first device if a cache hit occurs for a first cache request from the first device for first information, and for granting access to the cache by the second device if a cache miss occurs for the first cache request and a cache hit occurs for a second cache request from the second device for second information; and refill logic for fetching from a memory the first information if a cache miss occurs for the first cache request while the second device is granted access to the cache.

12. The cache system of claim 11 wherein the access control logic further includes:

hold logic for holding access to the cache by the second device if the cache is busy with a first granted access to the cache by the first device.

13. The cache system of claim 11 wherein the access control logic grants the first device access to the cache after first requested information is fetched from the memory if a cache miss occurred for the first cache request.

14. The cache system of claim 3, wherein the cache system stores scalars and vectors;

the requests include scalar requests and vector requests; and the access control logic includes logic for receiving and executing scalar requests and logic for receiving and executing vector requests.

15. A method for controlling a cache, the cache being coupled to at least one device, the method comprising:

receiving by a cache controller a first cache request from a first device of the at least one device;

providing by the cache controller a first request ID value corresponding to the first cache request to the first device after receiving the first cache request;

initiating processing of the first cache request after receiving the first cache request;

receiving by the cache controller a second cache request from a second device of the at least one device after receiving the first cache request;

providing by the cache controller a second request ID value corresponding to the second cache request to the second device after receiving the second cache request;

initiating processing of the second cache request after receiving the second cache request;

completing the processing of the first cache request after receiving the second cache request; and completing the processing of the second cache request after receiving the second cache request.

16. The method of claim 15 wherein the providing by the cache controller the first request ID value includes providing a first unit ID uniquely identifying the first device; and providing a first transaction ID uniquely identifying the first cache request from other cache requests; and the providing by the cache controller the second request ID value includes providing a second unit ID uniquely identifying the second device; and providing a second transaction ID uniquely identifying the second cache request from other cache requests.

17. The method of claim 15 wherein the first and second devices are the same device.

18. A method of controlling a cache, the cache coupled to a cache controller and a cache accessing device, the method comprising:

a first step of receiving a first cache request from the cache accessing device by the cache controller;

a second step of providing a first request ID to the cache accessing device by the cache controller after the first step;

a third step of storing the first request ID by the cache accessing device after the second step;

a fourth step of receiving a second cache request from the cache accessing device by the cache controller after the first step;

a fifth step of providing a second request ID to the cache accessing device by the cache controller after the fourth step;

a sixth step of storing the second request ID by the cache accessing device after the fifth step;

a seventh step of processing the first cache request after the second step; and an eighth step of processing the second cache request after the fifth step.

19. The method of claim 18 further comprising:

a ninth step of providing a cache request result and the corresponding request ID to the cache accessing device after each corresponding cache request is processed, if a cache request result is required by the corresponding cache request.

20. The method of claim 19 wherein the ninth step comprises:

a tenth step of providing a first cache request result and the first request ID to the cache accessing device after the seventh step;

an eleventh step of recognizing the request ID by the cache accessing device after the tenth step;

an twelfth step of receiving and storing the first cache request result by the cache accessing device after the eleventh step;

a thirteenth step of providing a second cache request result and the second request ID to the cache accessing devices after the eighth step;

a fourteenth step of recognizing the request ID by the cache accessing device after the thirteenth step; and a fifteenth step of receiving and storing the second cache request result by the cache accessing device after the fourteenth step.

21. The method of claim 18 wherein the first cache request is received by the cache controller from a first cache accessing device; and the second cache request is received by the cache controller from a second cache accessing device.

22. The method of claim 21, wherein the first step comprises:

receiving the first cache request by the cache controller; and receiving a first device ID identifying the first cache accessing device to the cache controller; and the fourth step comprises:

receiving the second cache request by the cache controller; and receiving a second device ID identifying the second cache accessing device to the cache controller.

23. The method of claim 22 wherein the second step comprises:

providing the first device ID identifying the first cache accessing device; and providing a first transaction ID identifying the first cache request; and the fifth step comprises:

providing the second device ID identifying the second cache accessing device; and providing a second transaction ID identifying the second cache request.

24. The method of claim 21 further comprising:

a ninth step of providing a cache request result and the corresponding device and transaction IDs to the cache accessing devices after each corresponding cache request is processed, if a cache request result is required by the corresponding cache request.

25. The method of claim 24 wherein the ninth step comprises:

a tenth step of providing a first cache request result and the first device and transaction IDs to the cache accessing devices after the seventh step;

an eleventh step of recognizing the first device IDs by the first cache accessing device after the tenth step;

an twelfth step of receiving and storing the first cache request result by the first cache accessing device after the eleventh step;

a thirteenth step of providing a second cache request result and the second device and transaction IDs to the cache accessing devices after the eighth step;

a fourteenth step of recognizing the second device ID by the second cache accessing device after the thirteenth step; and a fifteenth step of receiving and storing the second cache request result by the second cache accessing device after the fourteenth step.

26. A cache control unit for controlling a cache system, the cache control unit comprising:

means for receiving requests from a cache requesting device into a request queue;

means for stalling further requests until pending requests are serviced;

means for providing request identification information to the cache requesting device, the request identification information uniquely identifying each request received from a cache requesting device;

means for servicing the requests, including means for servicing a second received request before a first received request is serviced;

means for providing requested information from a cache line and corresponding request identification information to a requesting device;

means for providing requested information and corresponding request identification information to a requesting device after a cache line is refilled from the memory;

means for refilling information from a memory when a cache miss occurs;

means for writing a dirty cache line to the memory; and means for writing from the cache to the memory.

27. The cache control unit of claim 26, wherein the cache system stores scalars and vectors;

the requests include scalar requests and vector requests; and the means for servicing the requests includes means for servicing scalar requests and vector requests.

28. The cache control unit of claim 26 further comprising a general purpose processor interface state machine for interfacing with a general purpose processor, the general purpose processor interface state machine comprising:

a start state for receiving requests from a general purpose processor, the general purpose processor interface state machine remaining in the start state when no requests are made by the general purpose processor;

a hold state for granting a first request but holding the first request while a second request is serviced, the general purpose processor interface state machine transitioning from the start state to the hold state when a request is received from the general purpose processor and granted by the cache control unit and the cache control unit is servicing a second request, the general purpose processor interface state machine remaining in the hold state until the second request is serviced, the general purpose processor interface state machine transitioning to the tag state when the second request is serviced;

a tag state for checking for address tag matches for granted requests, the general purpose processor interface state machine transitioning from the start state to the tag state when the cache control unit is ready to service the granted requests, the general purpose processor interface state machine transitioning from the hold state to the tag state when the cache control unit is ready to service the granted requests;

a miss state for sending a cache fill request to a memory, the general purpose processor interface state machine transitioning from the tag state to the miss state when a cache miss occurs;

a data state for returning requested information to the cache requesting device, the general purpose processor interface state machine transitioning from the tag state to the data state when a cache hit occurs, the general purpose processor interface state machine transitioning from the miss state to the data state when the cache fill request is serviced by the memory.

29. The cache control unit of claim 26 further comprising a bus interface state machine for interfacing with a bus, the bus coupled with a memory, the bus interface state machine comprising:

an idle state for receiving requests from a cache requesting device, the bus interface state machine remaining in the idle state when no requests are received;

a request state for requesting access to the bus, the bus interface state machine transitioning to the request state from the idle state when access to the memory by the cache system is required, the bus interface state machine remaining in the request state when the cache system has not been granted access to the bus;

a first greater state for granting bus access to the cache system for a first data group having a first size, the bus interface state machine transitioning to the first greater state from the request state when the bus grants bus access to the cache system, the bus interface state machine transitions from the first greater state to the idle state when the first size access is complete;

a second greater state for granting bus access to the cache system for a second data group, the first data group and the second data group together having a second size greater than the first size, the bus interface state machine transitioning to the second greater state from the first greater state when the bus grants bus access to the cache system for a second size access, the bus interface state machine transitions from the second greater state to the idle state when the second size access is complete;

a third greater state for granting bus access to the cache system for a third data group, the first, second and third data groups together having a third size greater than the second size, the bus interface state machine transitioning to the third greater state from the second greater state when the bus grants bus access to the cache system for a third size access, the bus interface state machine transitions from the third greater state to the idle state when the third size access is complete; and a fourth greater state for granting bus access to the cache system for a fourth data group, the first, second, third and fourth data groups together having a fourth size greater than the third size, the bus interface state machine transitioning to the fourth greater state from the third greater state when the bus grants bus access to the cache system for a fourth size access, the bus interface state machine transitions from the fourth greater state to the idle state when the fourth size access is complete.

30. The cache control unit of claim 26 further comprising a data receiver state machine for receiving data, the data receiver state machine comprising:

an idle state for awaiting receipt of data responsive to a request from a cache accessing device, the data receiver state machine remaining in the idle state when the data is not being received;

a first state for receiving a first data portion having a first size, the data receiver state machine transitioning to the first state from the idle state when the request has been serviced by the means for servicing the requests;

a second state for receiving a second data portion having a second size greater than the first size if the request from the cache accessing device was for data having the second size, the data receiver state machine transitioning to the second state from the first state when the request from the cache accessing device was for data having the second size;

a third state for receiving a third data portion having a third size greater than the second size if the request from the cache accessing device was for data having the third size, the data receiver state machine transitioning to the third state from the second state when the request from the cache accessing device was for data having the third size;

a fourth state for receiving a fourth data portion having a fourth size greater than the third size if the request from the cache accessing device was for data having the fourth size, the data receiver state machine transitioning to the fourth state from the third state when the request from the cache accessing device was for data having the fourth size;

a refill state for refilling the cache system with the data received responsive to a request from a cache accessing device, the data including the data portions received, the data receiver state machine transitioning to the refill state from the first state when the cache accessing device requested data having the first size and the first data portion is received, the data receiver state machine transitioning to the refill state from the second when the cache accessing device requested data having the second size and the second data portion is received, the data receiver state machine transitioning to the refill state from the third state when the cache accessing device requested data having the third size and the third data portion is received, the data receiver state machine transitioning to the refill state from the fourth state when the cache accessing device requested data having the fourth size and the fourth data portion is received; and a ready state for providing the data to the cache accessing device, the data receiver state machine transitioning to the ready state from the refill state when the cache system has been refilled, the data receiver state machine remaining in the ready state until the cache accessing device reads the data, the data receiver state machine transitioning from the ready state to the idle state when the cache accessing device reads the data.

31. The cache control unit of claim 26 further comprising a read state machine, the read state machine comprising:

an idle state, the read state machine entering the idle state after the cache control unit is reset, the read state machine remaining in the idle state until the cache control unit is ready to receive a read request;

a run state for receiving a read request from a cache requesting device, the read state machine transitioning to the run state from the idle state when the cache control unit is ready to receive a read request;

a stall state for preventing new read requests from being accepted, the read state machine transitioning to the stall state from the run state when additional resources are required to service the read operation;

a data ready state for driving data returned from a memory to the cache requesting device, the read state machine transitioning to the data ready state from the run state when the data has been driven to the cache requesting device;

a write back state for writing back a first dirty vector to a memory, the read state machine transitioning to the write back state from the run state when one dirty vector is to be written to the memory, the read state machine remaining in the write back state until the first dirty vector is written to the memory;

a next write back state for writing back a second dirty vector, the read state machine transitioning to the next write back state from the write back state when a subsequent dirty vector is to be written to the memory, the read state machine transitioning from the next write back state to the run state when the second dirty vector has been written to the memory.

32. The cache control unit of claim 31 wherein the read state machine remains in the idle state when no request is received;

remains in the idle state when a request is received and the request is granted but later revoked; and transitions to the run state when a request is received, granted and not revoked.

33. The cache control unit of claim 31 wherein the read state machine, when in the stall state, saves the address of an additional read request and revokes a read grant for the additional read request.

34. The cache control unit of claim 31 wherein the cache control unit further includes an address queue for temporarily storing read addresses for accessing a memory;

the read state machine transitions to the stall state when a clean read miss occurs and address queue is full; and the read state machine transitions to the stall state when a dirty read miss occurs and the address queue is full.

35. The cache control unit of claim 31 wherein the cache control unit further includes a write back latch for latching a dirty vector; and the read state machine transitions to the stall state when a dirty read miss occurs and the write back latch is full.

36. The cache control unit of claim 26 further comprising a write state machine, the write state machine comprising:

an idle state, the write state machine entering the idle state after the cache control unit is reset;

a run state for receiving a write request from a cache requesting device, the write state machine transitioning to the run state from the idle state when the cache control unit is ready to receive a write request;

a stall state for preventing new write requests from being accepted, the write state machine transitioning to the stall state from the run state when additional resources are required to service the write operation;

a refill state for a cache refill write wherein data is received from a memory, aligned if necessary and loaded into the cache, the write state machine transitioning to the refill state from the run state when data is returned from the memory to the cache;

a write back state for writing back a first dirty vector to a memory, the write state machine transitioning to the write back state from the run state when one dirty vector is to be written to the memory;

a next write back state for writing back a second dirty vector, the write state machine transitioning to the next write back state from the write back state when the first dirty vector has been written to the memory and a subsequent dirty vector is to be written to the memory, the write state machine transitioning from the next write back state to the run state when the second dirty vector has been written to the memory.

37. The cache control unit of claim 36 wherein the write state machine further comprises:

a memory low write state for bypassing the cache to write a first vector to the memory, the write state machine transitioning to the memory low write state from the run state when the first vector is to be written to a low vector location, the write state machine transitioning from the memory low write state to the stall state when the address queue is full; and a memory high write state for bypassing the cache to write a second vector to the memory, the write state machine transitioning to the memory high write state from the run state when the second vector is to be written to a high vector location, the write state machine transitioning to the memory high write state from the memory low write state when both the first and second vectors are to be written into the low and high vector locations, respectively.

* * * * *